(12) United States Patent
Sudo et al.

(10) Patent No.: US 12,504,350 B2
(45) Date of Patent: Dec. 23, 2025

(54) CONDITION MONITORING APPARATUS, METHOD, AND STORAGE MEDIUM

(71) Applicant: KABUSHIKI KAISHA TOSHIBA, Tokyo (JP)

(72) Inventors: Takashi Sudo, Fuchu (JP); Yasuhiro Kanishima, Tokyo (JP); Hiroyuki Yanagihashi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 401 days.

(21) Appl. No.: 17/942,275

(22) Filed: Sep. 12, 2022

(65) Prior Publication Data

US 2023/0296475 A1 Sep. 21, 2023

(30) Foreign Application Priority Data

Mar. 15, 2022 (JP) .................. 2022-040230

(51) Int. Cl.
*G01M 13/00* (2019.01)
*G01P 3/00* (2006.01)
*G01P 15/00* (2006.01)

(52) U.S. Cl.
CPC .............. *G01M 13/00* (2013.01); *G01P 3/00* (2013.01); *G01P 15/00* (2013.01)

(58) Field of Classification Search
CPC ...... G01M 13/00; G01M 7/00; G01M 17/007; G01P 3/00; G01P 15/00; B66B 5/0018; B66B 5/0025
See application file for complete search history.

(56) References Cited

U.S. PATENT DOCUMENTS

| 10,679,646 | B2 | 6/2020 | Komatsu et al. |
| 11,273,779 | B2 | 3/2022 | Murata et al. |
| 2014/0058736 | A1 | 2/2014 | Taniguchi et al. |

(Continued)

FOREIGN PATENT DOCUMENTS

| JP | 3872252 B2 | 1/2007 |
| JP | 4529611 B2 | 8/2010 |

(Continued)

OTHER PUBLICATIONS

Japanese Office Action issued Oct. 29, 2024 in Japanese Patent Application No. 2022-040230 (with unedited computer-generated English Translation), 6 pages.

*Primary Examiner* — Stephen D Meier
*Assistant Examiner* — Leo T Hinze
(74) *Attorney, Agent, or Firm* — Oblon, McClelland, Maier & Neustadt, L.L.P.

(57) ABSTRACT

According to one embodiment, a condition monitoring apparatus includes a processing circuitry. The processing circuitry is configured to collect a sensor signal output from a sensor that monitors a condition of a mechanical device that is at least partially mobile. The processing circuitry is configured to diagnose a presence or absence of an anomaly in the mechanical device based on the sensor signal. The processing circuitry is configured to cut out the sensor signal in a time width according to any one or more of a speed, an acceleration, and a jerk of the mechanical device. The processing circuitry is configured to determine the presence or absence of an anomaly based on the cut out sensor signal.

19 Claims, 13 Drawing Sheets

(56) References Cited

U.S. PATENT DOCUMENTS

| | | | |
|---|---|---|---|
| 2015/0284214 A1* | 10/2015 | Park | B66B 5/0025 |
| | | | 187/393 |
| 2019/0010018 A1* | 1/2019 | Lovett | B66B 5/0012 |
| 2021/0065918 A1 | 3/2021 | Kanishima et al. | |
| 2021/0272704 A1 | 9/2021 | Sudo et al. | |

FOREIGN PATENT DOCUMENTS

| | | | |
|---|---|---|---|
| JP | 2011-21 4964 A | | 10/2011 |
| JP | 2012-058171 A | | 3/2012 |
| JP | 2012197181 A | * | 10/2012 |
| JP | 5134525 B2 | | 1/2013 |
| JP | 5374427 B2 | | 12/2013 |
| JP | 5387442 B2 | | 1/2014 |
| JP | 5397075 B2 | | 1/2014 |
| JP | 5406866 B2 | | 2/2014 |
| JP | 5833477 B2 | | 12/2015 |
| JP | 5942388 B2 | | 6/2016 |
| JP | 6005443 B2 | | 10/2016 |
| JP | 2019-028482 A | | 2/2019 |
| JP | 6583392 B2 | | 10/2019 |
| JP | 2020-073366 A | | 5/2020 |
| JP | 2020200177 A | * | 12/2020 |
| JP | 2021-033842 A | | 3/2021 |
| JP | 6911854 B2 | | 7/2021 |
| JP | 2021-135780 A | | 9/2021 |
| JP | 2021-178530 A | | 11/2021 |

\* cited by examiner

Cutout condition determination unit

| Speed | Acceleration | Segment detection | Analysis length (time width) |
|---|---|---|---|
| Constant | 0 | Non-execution | First fixed length |
| Acceleration | + | Execution | Second fixed length |
| Deceleration | − | Execution | Third fixed length |
| Stopped 0 | 0 | Non-execution | First fixed length |

Cutout condition determination unit 12d

| | Speed | Acceleration | Segment detection | Analysis length (time width) |
|---|---|---|---|---|
| Drive unit: steady | Constant | 0 | Non-execution | First fixed length |
| Propulsion unit | Acceleration | + | Execution | Second fixed length |
| Suppression unit | Deceleration | − | Execution | Third fixed length |
| Door opening/closing unit: opening | Stopped 0 | 0 | Execution | Fourth fixed length |
| Door opening/closing unit: closing | Stopped 0 | 0 | Execution | Fifth fixed length |

Cutout condition determination unit 12e

| | Speed | Acceleration | Segment detection | Analysis length (time width) | Determination |
|---|---|---|---|---|---|
| Drive unit: steady | Constant | 0 | Non-execution | First fixed length | Power determination process |
| Propulsion unit | Acceleration | + | Execution | Second fixed length | Anomaly determination process |
| Suppression unit | Deceleration | − | Execution | Third fixed length | Anomaly determination process |
| Door opening/closing unit: opening | Stopped 0 | 0 | Execution | Fourth fixed length | Anomaly determination process |
| Door opening/closing unit: closing | Stopped 0 | 0 | Execution | Fifth fixed length | Anomaly determination process |

FIG. 11

CONDITION MONITORING APPARATUS,
METHOD, AND STORAGE MEDIUM

CROSS-REFERENCE TO RELATED
APPLICATION

This application is based upon and claims the benefit of priority from Japanese Patent Application No. 2022-040230, filed Mar. 15, 2022, the entire contents of which are incorporated herein by reference.

FIELD

Embodiments described herein relate generally to a condition monitoring apparatus, a condition monitoring method, and a storage medium.

BACKGROUND

With the recent development of the Internet of Things (IoT), condition monitoring apparatuses have been developed to monitor a condition of a mechanical device such as a moving body with a person on board by means of sensor signals (data) output from various sensors. For example, a condition monitoring apparatus constantly monitors an operating condition of a moving body based on a sensor signal collected from a sensor installed on the moving body and detects anomalies such as a sudden failure and deterioration due to aging. On the other hand, the moving body includes a propulsion mechanism for acceleration and a suppression mechanism for deceleration. Accordingly, the condition monitoring apparatus monitors various operating conditions of the moving body, such as at acceleration and deceleration, by means of sensor signals from various sensors.

Such a condition monitoring apparatus is required to maintain the accuracy of anomaly detection while reducing a processing amount of sensor signals.

BRIEF DESCRIPTION OF THE DRAWINGS

FIG. 2 is a diagram showing a relationship among speed, acceleration, segment detection, and analysis length according to the first embodiment.

FIG. 6 is a diagram exemplifying a relationship among speed, acceleration, door opening/closing, segment detection, and analysis length according to the first modification of the first embodiment.

FIG. 11 is a diagram exemplifying a relationship among speed, acceleration, door opening/closing, segment detection, analysis length, and determination according to the second embodiment.

DETAILED DESCRIPTION

In general, according to one embodiment, a condition monitoring apparatus includes a processing circuitry. The processing circuitry is configured to collect a sensor signal output from a sensor that monitors a condition of a mechanical device that is at least partially mobile. The processing circuitry is configured to diagnose a presence or absence of an anomaly in the mechanical device based on the sensor signal. The processing circuitry is configured to cut out the sensor signal in a time width according to any one or more of a speed, an acceleration, and a jerk of the mechanical device. The processing circuitry is configured to determine the presence or absence of an anomaly based on the cut out sensor signal.

Hereinafter, embodiments of a condition monitoring apparatus that monitors a condition of a mechanical device will be described in detail with reference to the accompanying drawings. In the following descriptions, the mechanical device is described as a device that is at least partially mobile. Further, among the mechanical devices, a device that moves a person is referred to as a moving body. In the following embodiments, among the moving bodies, an elevator that a person gets in and out of by opening and closing a door is described as an example, but the present invention is not limited thereto. For example, an automobile and a train are examples of moving bodies in which a person gets in and out through a door. In addition, the moving body may not necessarily have a door as long as it is a device that moves a person. For example, a moving body without a door is an escalator. Further, the moving body may not necessarily move a person directly, and may move a person indirectly. For example, a moving body that moves a person indirectly is a mechanical parking lot that moves an automobile with a person in it. Note that the mechanical device is not limited to a moving body that moves a person. For example, the mechanical device may be a configuration that is at least partially mobile (e.g., a palette) without a movement of a person, like a mechanical parking lot that moves a palette on which an unmanned automobile is placed. Like an industrial robot with a moving arm, the partially moving configuration may be such that the moving part (e.g., the arm) may be independent of a movement of a person. In addition, the mechanical device may be a device whose installing position and external shape are constant during operation. For example, a device in which an attached sensor moves, as in a case of a belt conveyor device in which a sensor is attached to a part of a belt, corresponds to a mechanical device. Further, the mechanical device may be a configuration in which the entire device moves independently of a movement of a person, like an autonomous robot. That is, the mechanical device can be a device that is at least partially mobile, and is not limited by the presence or absence of a movement of a person.

First Embodiment

Figure 1:
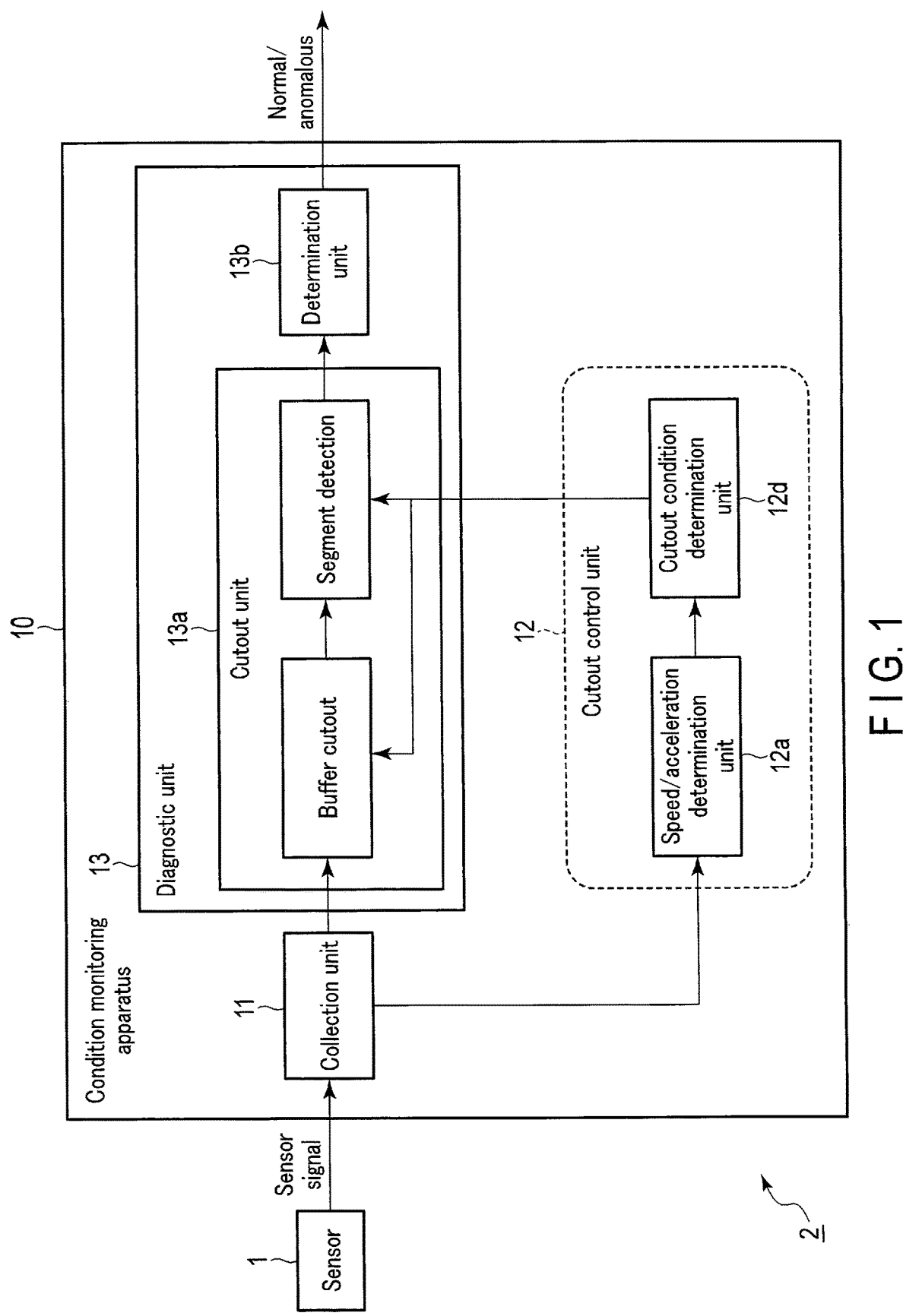
FIG. 1 is a diagram showing an example of a configuration of a condition monitoring apparatus according to a first embodiment and a peripheral configuration thereof.

FIG. 1 is a diagram showing an example of a configuration of a condition monitoring apparatus according to a first embodiment and a peripheral configuration thereof. This condition monitoring apparatus 10 is provided in a moving body 2, and includes a collection unit 11, a cutout control unit 12, and a diagnostic unit 13. Further, the cutout control unit 12 includes a speed/acceleration determination unit 12a and a cutout condition determination unit 12b. The diagnostic unit 13 includes a cutout unit 13a and a determination unit 13b. In FIG. 1, a sensor 1 is provided in the moving body 2 and connected to the collection unit 11. The moving body 2 is an example of a mechanical device that is at least partially mobile.

Here, the collection unit 11, for example, collects a sensor signal, which is a time-series signal output from the sensor 1 that monitors a condition of the moving body 2 such as an elevator. In addition, the collection unit 11 sends the collected sensor signal to the cutout control unit 12 and the diagnostic unit 13. For example, the collection unit 11 sends a sensor signal output from a vibration sensor as an acceleration sensor to the cutout control unit 12 and the diagnostic unit 13. The configuration is not limited thereto, and the collection unit 11 may send the sensor signal output from the vibration sensor as an acceleration sensor to the cutout control unit 12, and may send a sensor signal output from a microphone as an acoustic sensor to the diagnostic unit 13. That is, as the sensor 1 and the sensor signal, an acceleration sensor and an acceleration signal may be used, and an acoustic sensor and a sound signal may be used.

The cutout control unit 12 includes the speed/acceleration determination unit 12a and the cutout condition determination unit 12b.

The speed/acceleration determination unit 12a determines that a speed of the moving body 2 is in a constant speed condition, an acceleration condition, a deceleration condition, or a stopped condition based on the sensor signal sent out from the collection unit 11, and sends a determination result to the cutout condition determination unit 12b. The configuration is not limited thereto, and the speed/acceleration determination unit 12a may determine that the speed of the moving body 2 is in the constant speed condition, acceleration condition, deceleration condition, or stopped condition based on a trigger signal that promotes or suppresses driving of the moving body 2, and send a determination result to the cutout condition determination unit 12b.

The cutout condition determination unit 12b determines execution or non-execution of segment detection and an analysis length (i.e., a time width or a frame length) as cutout conditions for cutting out the sensor signal based on the determination result sent out from the speed/acceleration determination unit 12a. Note that the cutout condition determination unit 12b may also determine an overlap ratio and a shift amount together. The overlap ratio is a ratio of an overlapping portion of a cut out segment and another cut out segment to the cut out segment. For example, a segment of a first segment cut out at times 0 to 10 that overlaps another second segment cut out at times 5 to 15 is a third segment at times 5 to 10. In this case, an overlap ratio is obtained as 50% (=5/10) from the length of the third segment "5"/the length of the first segment "10". The shift amount means a time difference between a starting point of a segment to be cut out and a starting point of a next segment to be cut out.

For example, in a case of the first segment cut out at times 0 to 10 and another second segment cut out at times 5 to 15, a shift amount can be obtained as a time difference "5" (=5−0) between the starting point "0" of the first segment and the starting point "5" of the second segment. Note that a shift amount corresponds to an analysis length minus a length of an overlapped segment. That is, the shift amount corresponds to an amount obtained from the formula (1−overlap ratio)×analysis length. Further, specifically as shown in FIG. 2, for example, when the speed of the moving body 2 is in a constant speed condition (acceleration is zero), the cutout condition determination unit 12b determines that the execution or non-execution of segment detection is "non-execution of segment detection" and the analysis length is a "first fixed length". Further, when the speed of the moving body 2 is in an acceleration condition (positive acceleration), for example, it is determined that the execution or non-execution of segment detection is "execution of segment detection" and the analysis length is a "second fixed length". Similarly, when the speed of the moving body 2 is in a deceleration condition (negative acceleration), it is determined that the execution or non-execution of segment detection is "execution of segment detection" and the analysis length is a "third fixed length". Further, when the speed of the moving body 2 is in a stopped condition (both speed and acceleration are zero), for example, it is determined that the execution or non-execution of segment detection is "non-execution of segment detection" and the analysis length is the "first fixed length". Here, the first fixed length is a time width longer than each of the second fixed length and the third fixed length. The second fixed length and the third fixed length may be time widths that are equal to each other or time widths that are different from each other. Note that FIG. 2 does not take doors into account, but may take doors opening/closing into account. For example, when the speed of the moving body 2 is in a stopped condition (both speed and acceleration are zero) and it is during an opening operation of a door, it is determined that the execution or non-execution of segment detection is "execution of segment detection" and the analysis length is a "fourth fixed length". Similarly, for example, when the speed of the moving body 2 is in a stopped condition (both speed and acceleration are zero) and it is during a closing operation of a door, it is determined that the execution or non-execution of segment detection is "execution of segment detection" and the analysis length is a "fifth fixed length". Here, the fourth fixed length and the fifth fixed length are time widths shorter than the first fixed length. The fourth fixed length and the fifth fixed length may be time widths that are equal to each other or time widths that are different from each other. Further, the segment detection is a process of detecting a segment to be cut out from a sensor signal. As the segment detection, a method of detecting and cutting out a segment of an analysis length including a sensor signal having a high degree of similarity to a template signal prepared in advance or a method of detecting a segment until an analysis length elapses from a cutout starting point, which is an operation start timing of the moving body 2, can be used as appropriate. The method of cutting out a segment for an analysis length from an operation start timing of the moving body 2 is easy, but in a case of detecting a trigger signal from hardware, the accuracy of segment detection may decrease depending on the hardware. The method using a template signal is preferred because of its high segment detection accuracy, but is not required. As the operation start timing, by using an acceleration and a jerk (a change rate of acceleration per unit time), an operation start timing of acceleration is estimated in a case where, for example, the acceleration is zero or starts to increase from 0 and the jerk is positive. Then, for example, in a case where the acceleration is zero or starts to decrease from 0 and the jerk is negative, an operation start timing of deceleration is estimated. In addition, when a trigger signal to start an opening operation or closing operation of a door is detected, an operation start timing of the opening operation or closing operation of the door is estimated. Furthermore, in a case where the moving body 2 operates in a vertical direction, ascent and descent are collected by the collection unit 11 as sensor signals from a sensor installed outside the moving body 2 and determined. Then, taking into account gravitational acceleration, at the time of ascent, an operation start timing of acceleration is estimated in a case where, for example, the acceleration is zero or starts to increase from zero and the jerk is positive. At the time of ascent, for example, in a case where the acceleration is zero or starts to decrease from zero and the jerk is negative, an operation start timing of deceleration is estimated. At the time of descent, for example, an operation timing of acceleration is estimated in a case where the acceleration starts to decrease (the jerk becomes negative from 0), and an operation timing of deceleration is estimated in a case where the acceleration starts to increase (the jerk becomes positive from 0).

In addition, the cutout condition determination unit 12b sends the determined cutout conditions to the diagnostic unit 13.

The diagnostic unit 13 determines the presence or absence of an anomaly in the moving body 2 based on the sensor signal collected by the collection unit 11. For example, the diagnostic unit 13 may determine the presence or absence of an anomaly in the moving body 2 based on the sensor signal collected by the collection unit 11 and the cutout conditions determined by the cutout condition determination unit 12b. For example, the diagnostic unit 13 includes the cutout unit 13a and the determination unit 13b.

The cutout unit 13a cuts out the sensor signal in a time width according to any one or more of the speed, acceleration, and jerk of the moving body 2. For example, the cutout unit 13a may cut out the sensor signal based on the cutout conditions determined by the cutout condition determination unit 12b. Specifically, for example, the cutout unit 13a may cut out the sensor signal at the first fixed length (a first time width) in a case where the moving body 2 is moving at a constant speed. In addition, in a case where the moving body 2 is accelerating or decelerating, the cutout unit 13a may cut out the sensor signal at the second fixed length or the third fixed length (a second time width) from a point in time at which the acceleration or deceleration occurs. In the case of no segment detection, the cutout unit 13a may cut out the sensor signal (time-series signal) from a timing slightly before an operation start timing until a time at which the first fixed length elapses by having a buffer. The cutout unit 13a may also differentiate feature values, such as a time waveform and a power spectrum, or detailed parameters thereof, as inputs to the determination unit 13b, which performs the anomaly determination processing, depending on the constant speed, acceleration, deceleration, and stopping.

The determination unit 13b determines the presence or absence of an anomaly in the moving body 2 based on that cut out sensor signal. Anomalies include, for example, a sudden failure and deterioration due to aging. The determination unit 13b outputs a determination result indicating normal (no anomaly) or anomalous (anomaly present). Specifically, for example, the determination unit 13b may calculate an anomaly score based on the cut out sensor signal, and determine that the moving body 2 is anomalous if the anomaly score is greater than a threshold value. The determination unit 13b may also determine the presence or absence of an anomaly by inputting the cut out sensor signal into an unsupervised trained machine learning model and comparing an anomaly score output from the machine learning model with the threshold value. Here, as a trained machine learning model, a neural network that has been trained unsupervised in advance (e.g., autoencoder, convolutional autoencoder, variational autoencoder, etc.) can be used as appropriate.

Figure 3:
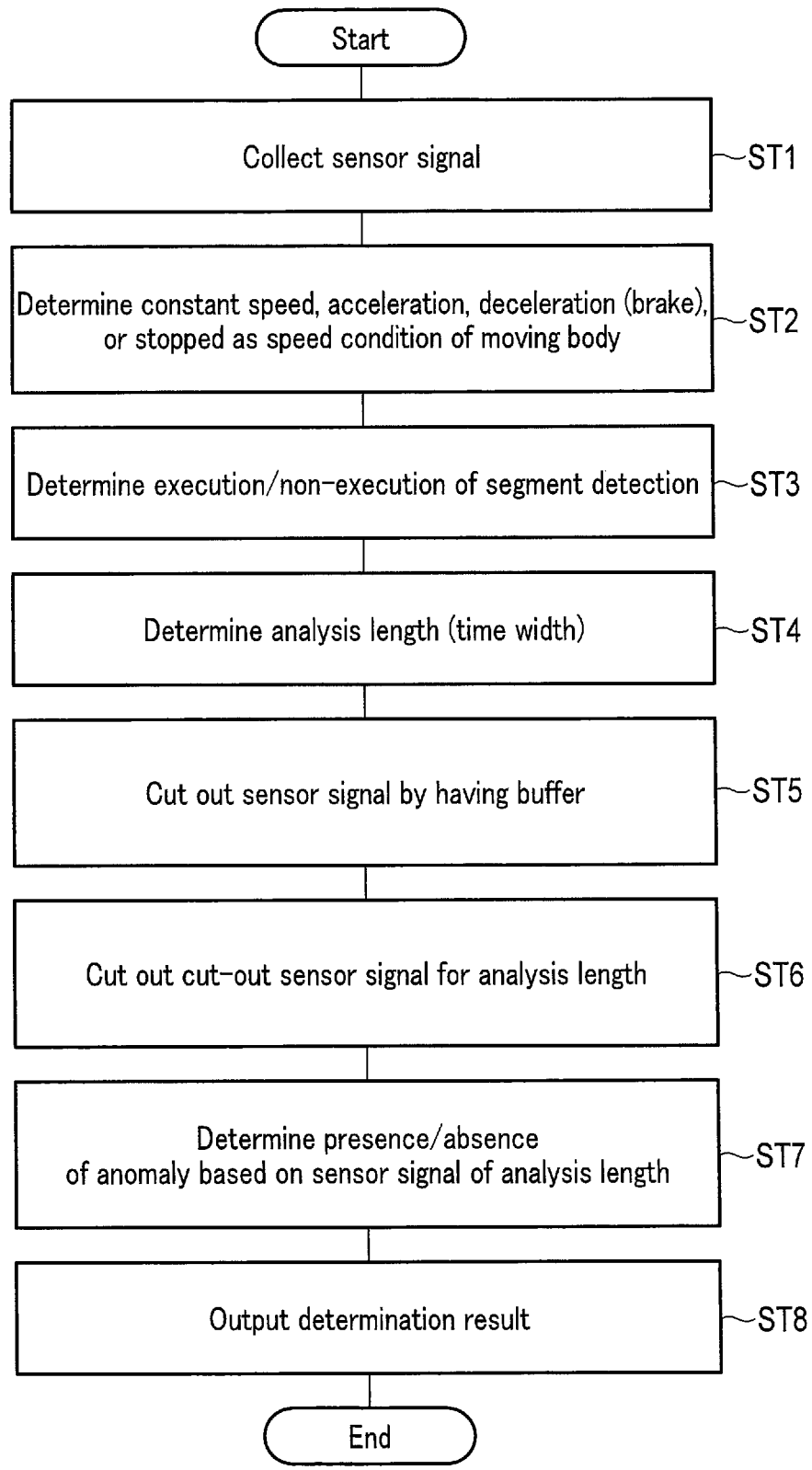
FIG. 3 is a flowchart for describing an example of an operation in the first embodiment.

Next, an operation of the condition monitoring apparatus having the above configuration will be described with reference to a flowchart in FIG. 3.

First, the collection unit 11 collects a sensor signal, which is a time-series signal output from the sensor 1 that monitors the condition of the moving body 2 (step ST1). In addition, the collection unit 11 sends the collected sensor signal to the cutout control unit 12 and the diagnostic unit 13. For example, the collection unit 11 sends a sensor signal output from a vibration sensor as an acceleration sensor to the cutout control unit 12, and a sensor signal output from a microphone as an acoustic sensor to the diagnostic unit 13.

After step ST1, the speed/acceleration determination unit 12a in the cutout control unit 12 determines that the speed of the moving body 2 is in a constant speed condition, acceleration condition, deceleration condition, or stopped condition based on the sensor signal sent out (step ST2). At this time, the speed/acceleration determination unit 12a may determine a start of the acceleration condition or a start of the deceleration condition by a jerk based on the sensor signal. For example, the speed/acceleration determination unit 12a may determine an operation start timing of the acceleration condition by a zero acceleration and a positive jerk. Similarly, the speed/acceleration determination unit 12a may determine an operation start timing of the deceleration condition by a zero acceleration and a negative jerk. After that, the speed/acceleration determination unit 12a sends a determination result to the cutout condition determination unit 12b.

After step ST2, based on the determination result sent out, the cutout condition determination unit 12b determines the execution or non-execution of segment detection and an analysis length (time width) as cutout conditions for cutting out the sensor signal (steps ST3 and ST4). The cutout condition determination unit 12b sends the determined cutout conditions to the diagnostic unit 13.

Here, the determination of the cutout conditions is described in detail. During running at a constant speed, the sensor signal is cut out at a constant time interval and a constant time width. During acceleration or deceleration, the sensor signal is cut out in another time width from its operation start timing. This is due to the fact that an operating sound is a steady sound during constant running, and an operating sound is an unsteady sound during acceleration or deceleration. In the case of the steady sound, since the sensor signal does not change over some time width, it is sufficient to perform condition monitoring using a sensor signal of a constant time width at a constant time interval (intermittently). In the case of an unsteady sound (especially a sound that does not occur at a constant interval), a sensor signal for one operation is extracted without excess or deficiency using a change in sign of acceleration, a trigger signal from hardware linked to an operation start, or a segment detection process by cross-correlation matching using a template signal. As such, extracting a sensor signal that detects an unsteady sound without excess or deficiency leads to both accuracies in condition monitoring and a low processing amount. If a sensor signal of a constant time width is cut out at a constant time interval (intermittently) for an unsteady sound, a fragmentary sensor signal or a signal with no sensor signal amplitude would be cut out. Using a sensor signal cut out in this manner reduces an estimation accuracy of condition monitoring and anomaly detection. To prevent the accuracy reduction, a longer time width results in a larger delay, while a finer and overlapping time interval for condition monitoring and anomaly detection at each shift increases the processing amount.

Thus, an analysis length for an unsteady sound is desired to be determined differently than that for a steady sound. For example, as shown in FIG. 2, the speed and the acceleration are ascertained by the speed/acceleration determination unit 12a, and the length of the sensor signal to be cut out (analysis length) and the execution or non-execution of segment detection are determined by the cutout condition determination unit 12b. The cutout condition determination unit 12b determines the first fixed length and non-execution of segment detection when running at a constant speed and when stopped, the second fixed length and execution of segment detection when accelerating, and the third fixed length and execution of segment detection when decelerating.

After step ST4, the diagnostic unit 13 determines the presence or absence of an anomaly in the moving body 2 based on the sensor signal collected by the collection unit 11 (steps ST5 to ST7). In detail, the cutout unit 13a in the diagnostic unit 13 cuts out the sensor signal in a time width according to any one or more of the speed, acceleration, and jerk of the moving body 2. For example, the cutout unit 13a cuts out the sensor signal based on the cutout conditions determined by the cutout condition determination unit 12b (steps ST5 and ST6). Specifically, for example, the cutout unit 13a cuts out the sensor signal at the first fixed length without executing segment detection in the case where the moving body 2 is moving at a constant speed. In the case where the moving body 2 is accelerating or decelerating, the cutout unit 13a uses segment detection and cuts out the sensor signal at the second or third fixed length from a point in time at which that acceleration or deceleration occurs. In the case of no segment detection, the cutout unit 13a may cut out the sensor signal (time-series signal) from a timing slightly before an operation start timing until a time of the first fixed length elapses by having a buffer.

After step ST6, the determination unit 13b determines the presence or absence of an anomaly in the moving body 2 based on that cut out sensor signal (step ST7). For example, the determination unit 13b calculates an anomaly score based on the cut out sensor signal, and determines the moving body 2 to be anomalous if the anomaly score is greater than a threshold value. At this time, the determination unit 13b may determine the presence or absence of an anomaly by inputting the cut out sensor signal into an unsupervised trained machine learning model and comparing an anomaly score output from the machine learning model with the threshold value.

After step ST7, the determination unit 13b outputs a determination result indicating normality or anomaly (step ST8).

Figure 4:
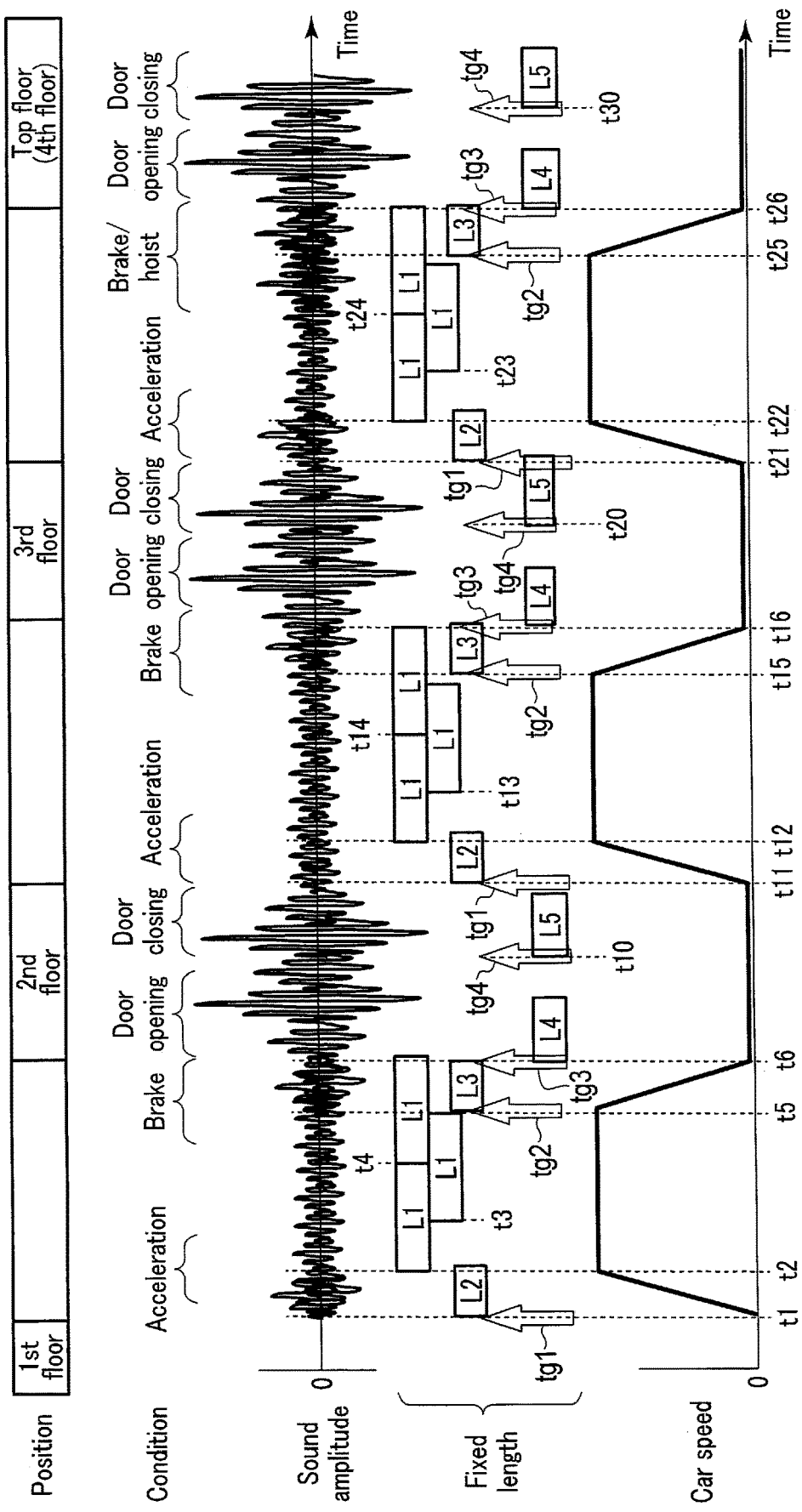
FIG. 4 is a time chart for describing an example of an operation in the first embodiment.

FIG. 4 is a time chart for describing an example of such an operation. However, FIG. 4 will be described using an example of an elevator, which is a moving body 2 with a door. As shown as "sound amplitude" in the middle row of FIG. 4, when the moving body 2 stops, an unsteady attack sound of a door opening/closing is generated. A steady sound is generated when the moving body 2 is running. Therefore, the condition monitoring apparatus 10 detects when running, accelerating, decelerating (braking), door opening, and door closing are occurring, and when the elevator is near the top floor, and changes the segment for cutting out a sensor signal. When the moving body 2 is running, the steady sound is analyzed at the first fixed length. For an unsteady sound of acceleration, deceleration, door opening, and door closing, segment detection processing using a sensor signal from a vibration sensor, a trigger signal from hardware, or template matching may be implemented together, and the sensor signal may be cut out at the second, third, fourth, and fifth fixed lengths.

Specifically, for example, when moving from the first floor to the second floor, the moving body 2 transitions from a stopped condition to an acceleration condition at time t1. The condition monitoring device 10 performs anomaly determination by cutting out the sensor signal for a second fixed length L2 from an operation start timing tg1 at time t1.

The moving body 2 transitions from the acceleration condition to the constant speed condition at time t2. The condition monitoring apparatus 10 cuts out the sensor signal for a first fixed length L1 from an operation start timing at time t2 to perform anomaly determination. When in the constant speed condition, the condition monitoring apparatus 10 cuts out the sensor signal for the first fixed length L1 from time t3, which is a predetermined time after time t2, to perform anomaly determination. At this time, an overlap ratio is set to 50% and a shift amount is half of the first fixed length L1. Similarly, when in the constant speed condition, the condition monitoring apparatus 10 cuts out the sensor signal for the first fixed length L1 from time t4, which is a predetermined time after time t3, to perform anomaly determination. In this example, the sensor signal is continuously cut out at the first fixed length L1, but the configuration is not limited thereto. That is, the sensor signal may be intermittently cut out at the first fixed length L1.

The moving body 2 transitions from the constant speed condition to a deceleration condition at time t5. The condition monitoring apparatus 10 cuts out the sensor signal for a third fixed length L3 from an operation start timing at time t5 to perform anomaly determination.

At time t6, the moving body 2 transitions from the deceleration condition to a stopped condition after arriving at the second floor. At this time, if an opening operation of the door of the moving body 2 is not started, the condition monitoring apparatus 10 cuts out the sensor signal for the first fixed length from time t6 to perform anomaly determination. In this example, it is assumed that the opening operation of the door of the moving body 2 is started. The condition monitoring apparatus 10 cuts out the sensor signal for a fourth fixed length L4 from an operation start timing at time t6 to perform anomaly determination.

After that, it is assumed that a closing operation of the door of the moving body 2 is started at time t10. The condition monitoring apparatus 10 cuts out the sensor signal for a fifth fixed length L5 from an operation start timing at time t10 to perform anomaly determination. In the following, in a case where the moving body 2 moves from the second floor to the third floor, the decimal place of the time should be read as "1" in the above description. Similarly, in a case where the moving body 2 moves from the third floor to the fourth floor, the decimal place of the time should be read as "2" in the above description. In a case where the moving body 2 moves from the fourth floor to the third floor, the decimal place of the time should be read as "3".

In the above example, the cutout conditions are determined based on the speed and acceleration. However, the cutout conditions may be determined not only based on these factors, but also by capturing a factor for which it is desired to use a different mode because a data quality changes. Such factors include those listed in (a) through (h) below. (a) Speed and acceleration: constant speed, acceleration, deceleration, and stopped, (b) jerk, (c) ascent/descent (acceleration in a direction of gravity), (d) load detected by a weight sensor, (e) door opening/closing, (f) passing by a balanced weight, (g) passing by an adjacent car, (h) near the top floor (hoist or electric motor). That is, the sensor signal cutout conditions may be determined based on the factors as indicated in (a) through (h) above.

According to the first embodiment as described above, the condition monitoring apparatus 10 includes the collection unit 11 and the diagnostic unit 13. The collection unit 11 collects a sensor signal output from the sensor 1 that monitors the condition of the moving body 2, which is an example of a mechanical device. The diagnostic unit 13 diagnoses the presence or absence of an anomaly in the moving body 2 based on the sensor signal. The diagnostic unit 13 includes the cutout unit 13a and the determination unit 13b. The cutout unit 13a cuts out the sensor signal in a time width according to any one or more of the speed, acceleration, and jerk of the moving body 2. The determination unit 13b determines the presence or absence of an anomaly based on the cut out sensor signal.

Therefore, according to the first embodiment, by cutting out the sensor signal in a time width corresponding to one or more of the speed, acceleration, and jerk of the moving body 2, the accuracy of anomaly detection can be maintained while reducing a processing amount of the sensor signal as compared to the case of constantly performing anomaly determination on the sensor signal. To supplement, by adjusting a time width (analysis length) for analyzing the sensor signal according to the running condition of the moving body 2, the sensor signal containing features according to the running condition is extracted without excess or deficiency. For example, the analysis length of the sensor signal should be of an appropriate size, since a long length will include useless data other than the features and a short length will exclude some features. The features according to the running condition can be detected, for example, as a frequency distribution of sensor signals of an operating sound.

According to the first embodiment, the cutout unit 13a cuts out the sensor signal in the first time width in a case where the moving body 2 is moving at a constant speed, and cuts out the sensor signal in the second time width from a point in time at which that acceleration or deceleration occurs in a case where the moving body 2 is accelerating or decelerating. This allows, in addition to the effects described above, the accuracy of anomaly detection to be maintained while reducing the processing amount of the sensor signal, especially during acceleration or deceleration. To supplement, since the drive condition is stable when the moving body 2 is running at a constant speed, the sensor signal can be cut out for a fixed segment (a first time width) from any given timing. In contrast, when the moving body is accelerating or decelerating, the drive condition is greatly promoted or suppressed immediately after an operation start timing, so the sensor signal is preferably cut out for a fixed segment (a second time width) from the acceleration or deceleration operation start timing. This allows an unsteady sound when accelerating or decelerating to be cut out without excess or deficiency. It is preferable that a time width to cut out a sensor signal during acceleration and a time width to cut out a sensor signal during deceleration be different, such as the second fixed length and the third fixed length, but they may also be the same.

According to the first embodiment, the moving body 2 has a door that can be opened and closed. When the moving body 2 stops to start opening or closing the door, the cutout unit 13a cuts out the sensor signal in a third time width from a point in time of such start. This allows, in addition to the effects described above, the accuracy of anomaly detection to be maintained while reducing the processing amount of the sensor signal, especially during the door opening or closing operation. To supplement, when the door of the moving body 2 is opened or closed, the door opening or closing operation is performed immediately after an operation start timing, so the sensor signal is preferably cut out at a fixed segment from the operation start timing of the door opening or closing operation. This allows an unsteady sound at the time of the door opening and closing to be cut out without excess or deficiency. It is preferable that a time width to cut out the sensor signal at the time of the door opening operation and a time width to cut out the sensor signal at the door closing operation be different, such as the fourth fixed length and the fifth fixed length, but they may also be the same.

According to the first embodiment, the sensor signal is an acceleration signal or a sound signal. This allows, in addition to the effects described above, the accuracy of anomaly detection to be maintained while reducing a processing amount of the acceleration signal or sound signal.

Further, according to the first embodiment, the determination unit 13b calculates an anomaly score based on the cut out sensor signal, and determines the moving body 2 to be anomalous if the anomaly score is greater than a threshold value. This allows, in addition to the effects described above, the anomaly determination to be performed using a desired threshold value.

In addition, according to the first embodiment, the determination unit 13b determines the presence or absence of an anomaly by inputting the cut out sensor signal into an unsupervised trained machine learning model and comparing an anomaly score output from the machine learning model with the threshold value. This allows, in addition to the effects described above, the anomaly determination to be performed using an unsupervised trained machine learning model.

First Modification of First Embodiment

In the first embodiment, speed, acceleration, etc. are determined based on the sensor signal collected by the collection unit 11, and an analysis length and the execution or non-execution of segment detection are determined.

Figure 5:
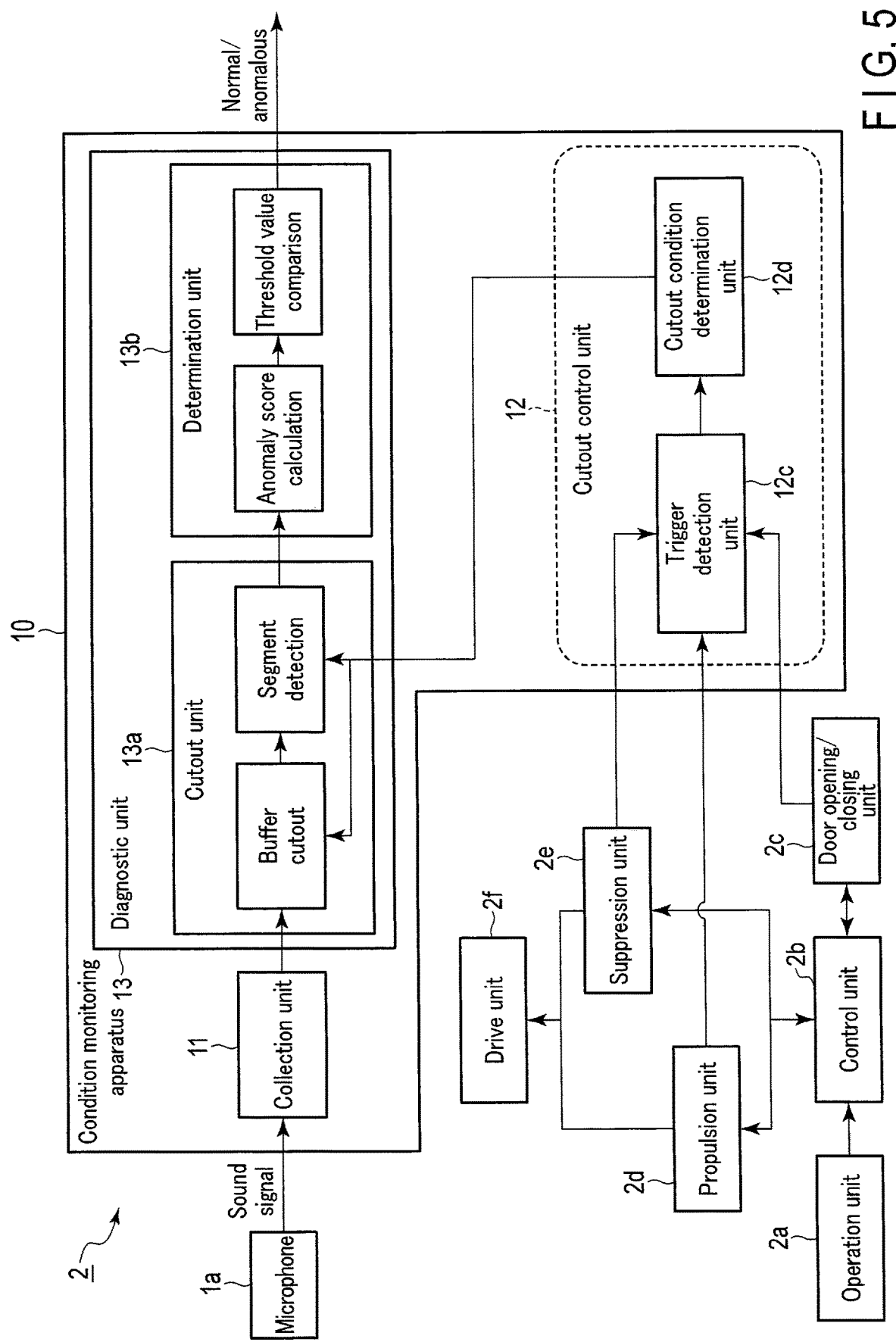
FIG. 5 is a diagram showing an example of a configuration of a condition monitoring apparatus according to a first modification of the first embodiment and a peripheral configuration thereof.

In contrast, in a first modification, as shown in FIG. 5, an analysis length and the execution or non-execution of segment detection are determined based on information (a trigger signal) collected from each unit of the moving body 2. In FIG. 5, portions corresponding to FIG. 1 are denoted by the same reference signs and detailed descriptions thereof are omitted, and different portions will be described. Similarly, a repeated description will be omitted in each embodiment and each modification below.

Here, the moving body 2 is, for example, an elevator, and includes hardware resources such as an operation unit 2a, a control unit 2b, a door opening/closing unit 2c, a propulsion unit 2d, a suppression unit 2e, and a drive unit 2f.

The operation unit 2a is, for example, provided in a car, and sends an input signal to the control unit 2b according to an operation of a person.

The control unit 2b is, for example, provided in a control panel arranged in a machine room, and controls the door opening/closing unit 2c, propulsion unit 2d, and suppression unit 2e according to the input signal.

The door opening/closing unit 2c is controlled by the control unit 2b, and performs an opening operation or closing operation of a door.

The propulsion unit 2d, for example, is an accelerator function such as a prime mover (motor), is controlled by the control unit 2b, and promotes driving of the drive unit 2f.

The suppression unit 2e, for example, is a brake function such as an electromagnetic brake, is controlled by the control unit 2b, and suppresses the driving of the drive unit 2f.

The drive unit 2f is, for example, a tire or pulley, and is controlled by the control unit 2b to drive.

On the other hand, the cutout control unit 12 detects a trigger signal to start a door opening or closing operation, and controls the cutout unit 13a based on that detection result. In addition, the cutout control unit 12 determines, based on a trigger signal to promote or suppress driving of the moving body 2, that the speed of that moving body 2 is in a constant speed condition, acceleration condition, or deceleration condition, and controls the cutout unit 13a based on that determination result. For example, the cutout control unit 12 includes a trigger detection unit 12c and a cutout condition determination unit 12d instead of the above-described speed/acceleration determination unit 12a and cutout condition determination unit 12b.

The trigger detection unit 12c detects the trigger signal to start a door opening or closing operation from the door opening/closing unit 2c, and sends a detection result to the cutout condition determination unit 12d. Further, the trigger detection unit 12c detects the trigger signal to promote driving of the drive unit 2f of the moving body 2 from the propulsion unit 2d, and sends a detection result to the cutout condition determination unit 12d. In addition, the trigger detection unit 12c detects a trigger signal to suppress driving of the drive unit 2f of the moving body 2 from the suppression unit 2e, and sends a detection result to the cutout condition determination unit 12d. Note that the trigger signal related to door opening/closing may also be read as hardware trigger information, opening/closing trigger information, or trigger information. Similarly, the trigger signal related to propulsion or suppression of driving may also be read as hardware trigger information, accelerator trigger information, brake trigger information, or trigger information.

The cutout condition determination unit 12d determines the execution or non-execution of segment detection and an analysis length (time width) as cutout conditions for cutting out a sensor signal based on the detection result sent out from the trigger detection unit 12c. Specifically, for example, as shown in FIG. 6, when the speed of the drive unit 2f is in a constant speed condition (zero acceleration), it is determined that the execution or non-execution of segment detection is "non-execution of segment detection" and the analysis length is the "first fixed length". In addition, for example, when the speed of the propulsion unit 2d is in an acceleration condition (positive acceleration), it is determined that the execution or non-execution of segment detection is "execution of segment detection" and the analysis length is the "second fixed length". Similarly, when the speed of the suppression unit 2e is in a deceleration condition (negative acceleration), it is determined that the execution or non-execution of segment detection is "execution of segment detection" and the analysis length is the "third fixed length". Further, when the speed of the moving body 2 is in a stopped condition (zero acceleration) and it is during a door opening operation, it is determined that the execution or non-execution of segment detection is "execution of segment detection" and the analysis length is the "fourth fixed length". Similarly, for example, when the speed of the moving body 2 is in a stopped condition (zero acceleration) and it is during a door closing operation, it is determined that the execution or non-execution of segment detection is "execution of segment detection" and the analysis length is the "fifth fixed length". Here, the first fixed length is a time width longer than each of the second fixed length, the third fixed length, the fourth fixed length, and the fifth fixed length. The second fixed length and the third fixed length may be time widths that are equal to each other or time widths that are different from each other. The fourth fixed length and the fifth fixed length may be time widths that are equal to each other or time widths that are different from each other. Further, the segment detection is a process of detecting a segment to be cut out from a sensor signal. As the segment detection, a method of detecting a segment of an analysis length including a sensor signal having a high degree of similarity to a template signal prepared in advance, a method of detecting a segment until an analysis length elapses from a cutout starting point, which is an operation start timing, etc. can be used as appropriate. As the operation start timing, for example, when the trigger signal related to driving propulsion is detected from the propulsion unit 2d, an operation start timing of an acceleration condition is estimated. Similarly, when the trigger signal related to driving suppression is detected from the suppression unit 2e, an operation start timing of a deceleration condition is estimated. In addition, when the trigger signal related to a door opening or closing operation is detected, an operation start timing of the door opening or closing operation is estimated.

Further, the cutout condition determination unit 12d controls the cutout unit 13a by sending the determined cutout conditions to the cutout unit 13a. A sensor signal cut out by the cutout unit 13a is a sound signal output from a microphone 1a and collected by the collection unit 11.

The rest of the configuration is the same as that of the first embodiment. Note that the condition monitoring apparatus 10 is preferably provided in a control panel in the same manner as the control unit 2b of the moving body 2 from the viewpoint of facilitating detection of the trigger signals from the door opening/closing unit 2c, the propulsion unit 2d, and the suppression unit 2e.

Figure 7:
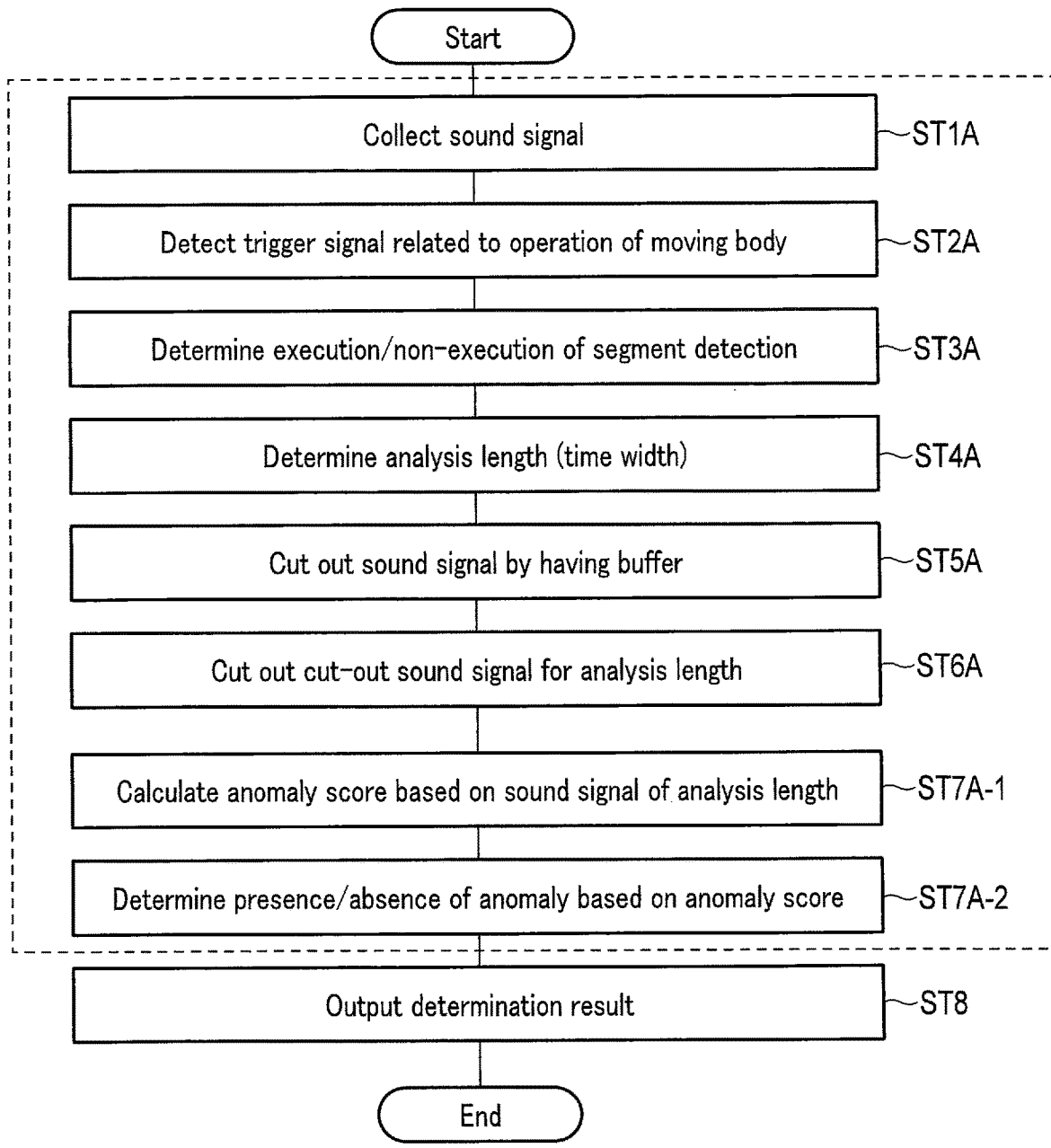
FIG. 7 is a flowchart for describing an example of an operation in the first modification of the first embodiment.

Next, an operation of the first modification having the above configuration will be described using a flowchart in FIG. 7.

First, the collection unit 11 collects a sound signal, which is a time-series signal output from the microphone 1a that monitors the condition of the moving body 2 (step ST1A). Further, the collection unit 11 sends the collected sound signal to the diagnostic unit 13.

After step ST1A, the trigger detection unit 12c in the cutout control unit 12 detects a trigger signal from the door opening/closing unit 2c, the propulsion unit 2d, or the suppression unit 2e of the moving body 2 (step ST2A). After that, the trigger detection unit 12c sends a detection result to the cutout condition determination unit 12d.

After step ST2A, based on the determination result sent out, the cutout condition determination unit 12d determines the execution or non-execution of segment detection and an analysis length (time width) as cutout conditions for cutting out the sound signal (steps ST3A and ST4A). At this time, the cutout condition determination unit 12d determines the first fixed length and non-execution of segment detection in a case of driving in a steady state by the drive unit 2f, the second fixed length and execution of segment detection in a case of being accelerated by the propulsion unit 2d, and the third fixed length and execution of segment detection in a case of being decelerated by the suppression unit 2e. In addition, the cutout condition determination unit 12d determines the fourth fixed length and execution of segment detection in a case where the door is brought into a closed state from an opened state by the door opening/closing unit 2c, and the fifth fixed length and execution of segment detection in a case where the door is brought into an opened state from a closed state by the door opening/closing unit 2c. After that, the cutout condition determination unit 12d sends the determined cutout conditions to the diagnostic unit 13.

After step ST4A, the diagnostic unit 13 determines the presence or absence of an anomaly in the moving body 2 based on the sound signal collected by the collection unit 11 (steps ST5A to ST7A-2). In detail, the cutout unit 13a in the diagnostic unit 13 cuts out the sound signal based on the cutout conditions determined by the cutout condition determination unit 12b (steps ST5A and ST6A). Specifically, for example, the cutout unit 13a cuts out the sound signal at the first fixed length without executing segment detection in a case where the moving body 2 is moving at a constant speed. In the case where the moving body 2 is accelerating or decelerating, the cutout unit 13a uses segment detection to cut out the sound signal at the second fixed length or the third fixed length from a point in time at which that acceleration or deceleration occurs. In the case of no segment detection, the cutout unit 13a may cut out the sound signal (time-series signal) from a timing slightly before an operation start timing until a time at which the first fixed length elapses by having a buffer.

After step ST6A, the determination unit 13b determines the presence or absence of an anomaly in the moving body 2 based on that cut out sound signal (steps ST7A-1 and ST7A-2). For example, the determination unit 13b calculates an anomaly score based on the cut out sensor signal, and determines the moving body 2 to be anomalous if the anomaly score is greater than a threshold value. At this time, the determination unit 13b may determine the presence or absence of an anomaly by inputting the cut out sensor signal into an unsupervised trained machine learning model and comparing an anomaly score output from the machine learning model with the threshold value.

After step ST7A-2, the determination unit 13b outputs a determination result indicating normality or anomaly (step ST8).

According to the first modification described above, the cutout control unit 12 detects the trigger signal to start an opening or closing operation, and controls the cutout unit 13a based on that detection result. According to the first modification, in addition to the effects of the first embodiment, especially, it is possible to maintain the accuracy of anomaly detection while reducing the processing amount of the sound signal during the door opening or closing operation.

In addition, according to the first modification, the cutout control unit 12 determines that the speed of the moving body 2 is in a constant speed condition, acceleration condition, or deceleration condition based on the trigger signal to promote or suppress driving of that moving body 2, and controls the cutout unit 13a based on that determination result. Therefore, according to the first modification, in addition to the effects of the first embodiment, the condition of the speed of the moving body can be easily determined by using the trigger signals to cause the moving body to operate.

The control systems such as the propulsion unit 2d, the suppression unit 2e, and the door opening/closing unit 2c can be realized in a compact system because the signals are gathered in a single device (control panel).

Second Modification of First Embodiment

In the first modification, the sound signal cut out by the cutout unit 13a is subjected to anomaly determination.

Figure 8:
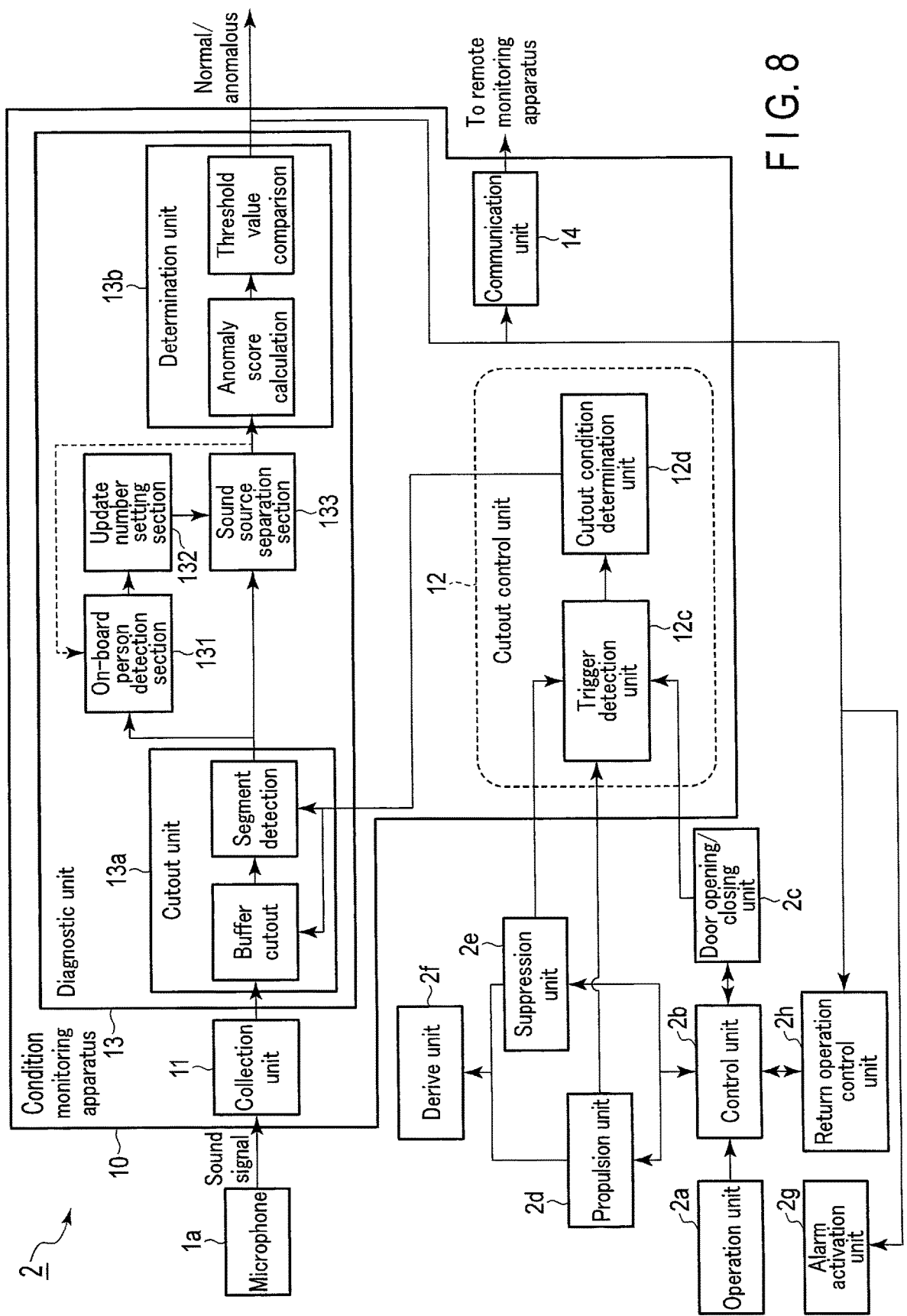
FIG. 8 is a diagram showing an example of a configuration of a condition monitoring apparatus according to a second modification of the first embodiment and a peripheral configuration thereof.

In contrast, in the second modification, as shown in FIG. 8, a sound source separation process is executed as preprocessing of anomaly determination, and the number of updates per frame of a filter coefficient in the sound source separation process is dynamically controlled.

For example, in condition monitoring for the operating sound in the elevator, sound source separation is introduced as preprocessing because it is necessary to extract the operating sound by avoiding voices (talking voices) of users in the car. However, in order to obtain a real-time condition monitoring result, it is necessary to reduce a processing amount of the sound source separation process. Therefore, in a second modification, the number of filter updates in the sound source separation process is dynamically controlled according to whether or not a person is on board. Accordingly, the processing amount is reduced when a person is on board, and an anomaly determination result can be output before (almost simultaneously with) receiving a complaint of unusual noise. In addition, when there is no person on board, the processing amount is returned to allow output of a highly accurate anomaly determination result.

Accordingly, specifically, the diagnostic unit 13 includes an on-board person detection section 131, an update number setting section 132, and a sound source separation section 133.

Here, the on-board person detection section 131 detects whether or not a person is on board according to the presence or absence of human voices based on a sound signal cut out by the cutout unit 13a. Not limited thereto, the on-board person detection section 131 may detect whether or not a person is on board according to the presence or absence of human voices based on the sound signal after sound source separation by the sound source separation section 133. Alternatively, the on-board person detection section 131 may detect the presence or absence of an on-board person based on an output signal output from a motion sensor, weight sensor, or image sensor provided in the moving body 2. In any case, the on-board person detection section 131 sends a detection result to the update number setting section 132.

The update number setting section 132 sets the number of updates of the filter coefficient of the sound source separation section 133 according to the detection result sent out from the on-board person detection section 131. For example, depending on the detection result, the update number setting section 132 sets the number of updates to a first set value if there is an on-board person, and sets the number of updates to a second set value greater than the first set value if there is no on-board person. The update number setting section is an example of a setting section.

The sound source separation section 133 has a filter to reduce noise from the sound signal, which is the sensor signal cut out by the cutout unit 13a, and outputs that noise-reduced sound signal to the determination unit 13b. The filter updates its coefficient according to the number of updates set by the update number setting section 132. That filter also executes a sound source separation process to separate human voices from the sound signal and extract the operating sound of the moving body 2. The sound signal after the sound source separation process is sent to the determination unit 13b.

The condition monitoring apparatus 10 also includes a communication unit 14.

The communication unit 14 sends a determination result of the determination unit 13b to a remote monitoring apparatus (not shown).

On the other hand, the moving body 2 includes an alarm activation unit 2g and a return operation control unit 2h.

If the determination by the determination unit 13b indicates that the moving body 2 is anomalous, the alarm activation unit 2g outputs an alarm, for example, in the elevator car or at an elevator station on each floor.

If the moving body 2 is determined to be anomalous in the determination by the determination unit 13b, the return operation control unit 2h moves the moving body 2 to the nearest floor and opens the door in a stopped condition.

The rest of the configuration is the same as that of the first modification.

Figure 9:
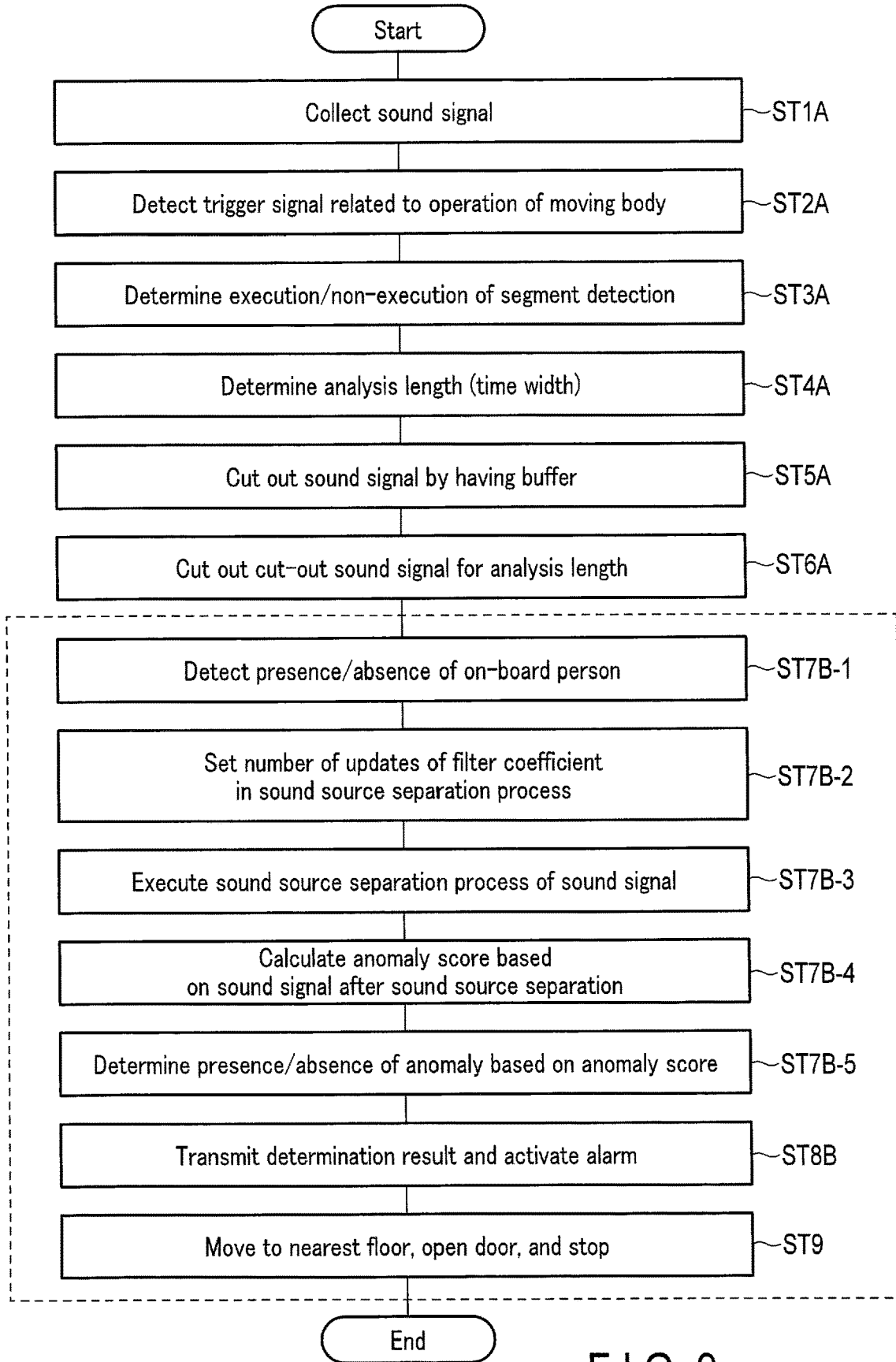
FIG. 9 is a flowchart for describing an example of an operation in the second modification of the first embodiment.

Next, an operation of the second modification having the above configuration will be described by using a flowchart in FIG. 9.

Suppose now that steps ST1A through ST6A are performed in the same manner as described above.

After step ST6A, the on-board person detection section 131 determines whether or not a person is on board based on the sound signal cut out by the cutout unit 13a (step ST7B-1). The on-board person detection section 131 also sends a detection result to the update number setting section 132.

After step ST7B-1, the update number setting section 132 sets the number of updates of the filter coefficient of the sound source separation section 133 according to the detection result sent out from the on-board person detection section 131 (step ST7B-2). For example, depending on the detection result, the update number setting section 132 sets the number of updates to the first set value if there is an on-board person, and sets the number of updates to the second set value greater than the first set value if there is no on-board person.

After step ST7B-2, the sound source separation section 133 executes a sound source separation process to reduce noise from the sound signal cut out by the cutout unit 13a using the filter (step ST7B-3), and outputs that noise-reduced sound signal to the determination unit 13b. In the sound source separation process, the filter coefficient is updated according to the set number of updates. When the number of updates is small, the sound source separation process can be executed at a high speed, and when the number of updates is large, the sound source separation process can be executed with a high degree of accuracy.

After step ST7B-3, the determination unit 13b determines the presence or absence of an anomaly in the moving body 2 based on the sound signal after the sound source separation (steps ST7B-4 and ST7B-5). For example, the determination unit 13b calculates an anomaly score based on the sound signal after the sound source separation, and determines the moving body 2 to be anomalous if the anomaly score is greater than a threshold value. At this time, the determination unit 13b may determine the presence or absence of an anomaly by inputting the sound signal after the sound source separation into an unsupervised trained machine learning model and comparing an anomaly score output from the machine learning model with the threshold value.

After step ST7B-5, the determination unit 13b outputs a determination result indicating normality or anomaly to the communication unit 14, alarm activation unit 2g, and return operation control unit 2h. The communication unit 14 transmits the determination result of the determination unit 13b to a remote monitoring apparatus (not shown). If the result of the determination by the determination unit 13b indicates that the moving body 2 is anomalous, the alarm activation unit 2g outputs an alarm, for example, in the elevator car or at the elevator station on each floor (step ST8B).

After step ST8B, if the moving body 2 is determined to be anomalous in the determination by the determination unit 13b, the return operation control unit 2h moves the moving body 2 to the nearest floor and opens the door in a stopped condition (step ST9).

According to the second modification as described above, the sensor signal is a sound signal. The diagnostic unit 13 further includes the sound source separation section 133 and the update number setting section 132. The sound source separation section 133 has the filter to reduce noise from that sound signal, which is the cut out sensor signal, and outputs that noise-reduced sound signal to the determination unit 13b. The update number setting section 132 sets the number of updates of the filter coefficient according to the presence or absence of an on-board person in the moving body 2. Therefore, in addition to the effects described above, it is possible to reduce noise from the sound signal by the filter and set the number of updates of the coefficient of that filter according to the presence or absence of an on-board person.

According to the second modification, the update number setting section 132 sets the number of updates to the first set value if there is an on-board person, and sets the number of updates to the second set value greater than the first set value if there is no on-board person. Therefore, in addition to the effects described above, the number of updates can be reduced when a person is on board, and the sound source separation process can be hastily executed so that an anomaly can be detected before a passenger makes a complaint about unusual noise. When there is no person on board, the number of updates can be increased and the sound source separation process can be executed slowly and accurately. To supplement, the sound source separation process is a time-consuming, high-load process, but the load is reduced if the number of updates of the filter coefficient is reduced. Thus, the time and load on the sound source separation process can be appropriately adjusted by switching the number of updates according to the presence or absence of an on-board person.

According to the second modification, the on-board person detection section 131 detects the presence or absence of an on-board person based on the sound signal and sends that detection result to the update number setting section 132. This allows, in addition to the effects described above, the presence or absence of an on-board person to be detected without the need for a new sensor to detect the presence or absence of an on-board person.

According to the second modification, the on-board person detection section 131 may detect the presence or absence of an on-board person based on the output signal output from the motion sensor, weight sensor, or image sensor provided in the moving body 2, and send that detection result to the update number setting section 132. In this case, in addition to the effects described above, the presence or absence of a person on board can be detected even when the voice of the person on board is low or when the microphone 1a is installed in a location where it is difficult to collect human voices.

Second Embodiment

The first embodiment, the first modification, and the second modification use the same anomaly determination processing.

In contrast, in a second embodiment, the above-described neural network-based anomaly determination processing is performed during door opening/closing, accelerating, and decelerating, while performing simplified anomaly determination processing with power determination only when running at a constant speed.

Figure 10:
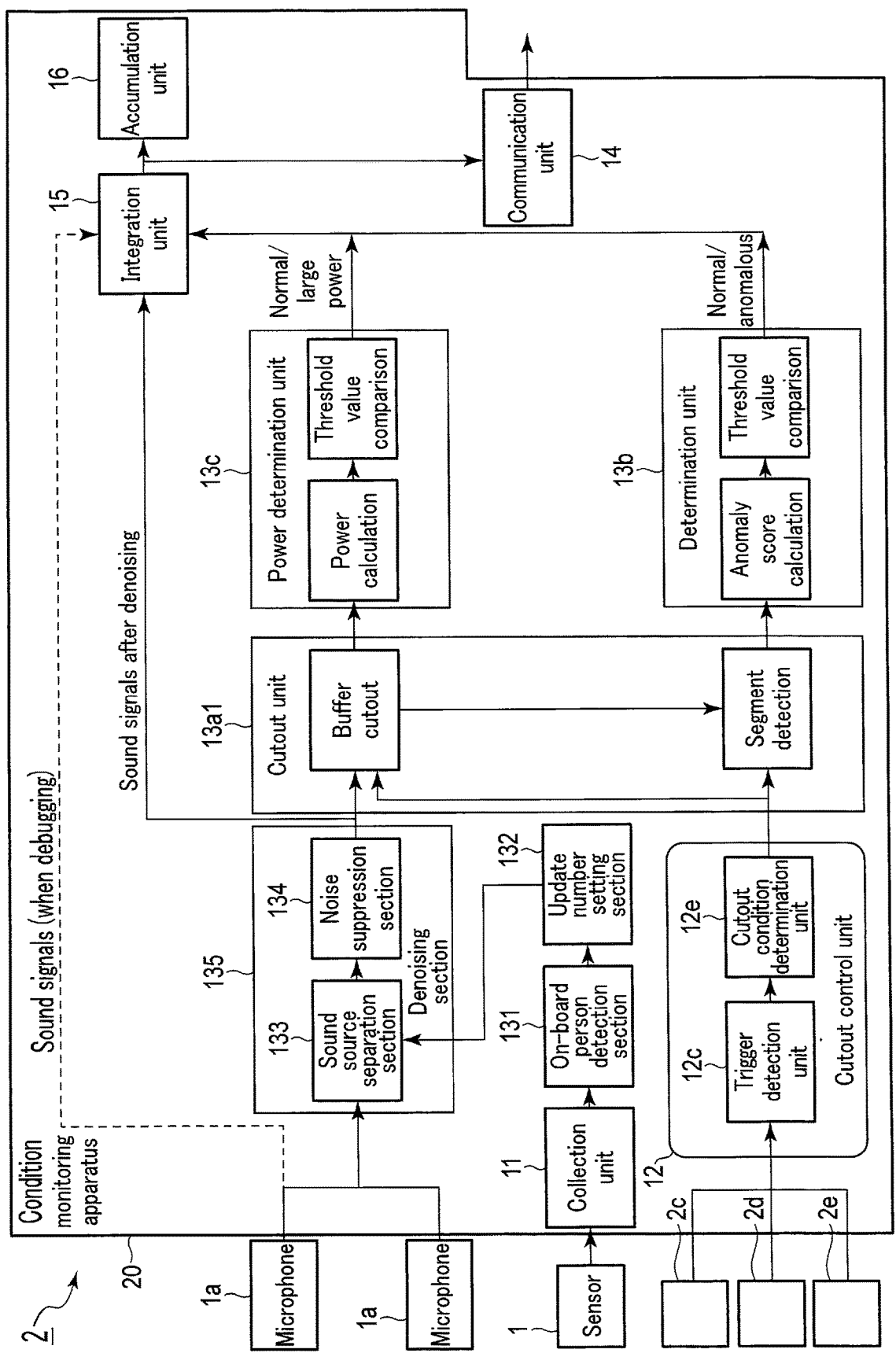
FIG. 10 is a diagram showing an example of a configuration of a condition monitoring apparatus according to a second embodiment and a peripheral configuration thereof.

FIG. 10 is a diagram showing an example of a configuration of a condition monitoring apparatus according to the second embodiment and a peripheral configuration thereof. This condition monitoring apparatus 20 includes a collection unit 11, a cutout control unit 12, an on-board person detection section 131, an update number setting section 132, a sound source separation section 133, a noise suppression section 134, a cutout unit 13a1, a determination unit 13b, a power determination unit 13c, a communication unit 14, an integration unit 15, and an accumulation unit 16. In detail, the cutout unit 13a1 and the integration unit 15 are connected to the subsequent stage of the collection unit 11 via the on-board person detection section 131, the update number setting section 132, the sound source separation section 133, and the noise suppression section 134. The sound source separation section 133 and the noise suppression section 134 constitute a denoise section 135. The integration section 15 is connected to the subsequent stage of the cutout unit 13a1 via the determination unit 13b and the power determination unit 13c in parallel. The communication unit 14 and the accumulation unit 16 are connected in parallel to the subsequent stage of the integration unit 15. A plurality of microphones 1a are connected to each of the sound source separation section 133 and the integration unit 15. The cutout unit 13a1 is connected to the subsequent stage of a trigger detection unit 12c via the cutout condition determination unit 12e. The determination unit 13b and the power determination unit 13c are examples of determination units. The cutout unit 13a1, the determination unit 13b, and the power determination unit 13c are examples of diagnostic units.

Here, each of the plurality of microphones 1a is installed inside and outside the elevator car, and sends a collected sound signal to the sound source separation section 133 and the integration unit 15.

A sensor 1 is a motion sensor, weight sensor, or image sensor provided in the moving body 2, and outputs a sensor signal to the collection unit 11.

The collection unit 11 collects the sensor signal output from the sensor 1 provided in the moving body 2, and sends that sensor signal to the on-board person detection section 131.

The on-board person detection section 131 detects the presence or absence of an on-board person based on the sensor signal sent out from the collection unit 11, and sends a detection result to the update number setting section 132.

The update number setting section 132 is the same as described above.

The sound source separation section 133 has a filter to reduce noise from the sound signals output from the plurality of microphones 1a, and outputs those noise-reduced sound signals to the noise suppression section 134. A coefficient of the filter is updated according to the number of updates set by the update number setting section 132. That filter also executes a sound source separation process to separate human voices from the sound signals and extract an operating sound of the moving body 2. The sound signals after the sound source separation process are sent to the noise suppression section 134.

The noise suppression section 134 suppresses a steady sound (steady noise) such as an air conditioner sound from the sound signals sent out from the sound source separation section 133, and sends those suppressed sound signals to the cutout unit 13a1 and the integration unit 15. The sound signals after noise has been reduced and suppressed by the sound source separation section 133 and the noise suppression section 134 may be referred to as sound signals after denoising.

The trigger detection unit 12c detects, as described above, a trigger signal related to door opening/closing, drive propulsion, or drive suppression from the door opening/closing unit 2c, the propulsion unit 2d, or the suppression unit 2e, and sends a detection result to the cutout condition determination unit 12e.

In addition to the determination of the above-described cutout condition determination unit 12d, the cutout condition determination unit 12e determines a determination process to be a "power determination process" or "anomaly determination process" based on the detection result of the trigger detection unit 12c, as shown in FIG. 11. In detail, in addition to the determination of the above-described cutout condition determination unit 12d, the cutout condition determination unit 12e determines the determination process to be the "power determination process" when the speed of the drive unit 2f is in a constant speed condition (zero acceleration), and in the other cases, determines the determination process to be the "anomaly determination process". The power determination process corresponds to the power determination unit 13c, and the anomaly determination process corresponds to the determination unit 13b.

If the moving body 2 is accelerating or decelerating, the determination unit 13b calculates an anomaly score of the sound signal, which is the cut out sensor signal, and determines the presence or absence of an anomaly based on the anomaly score and a threshold value. As described above, the determination unit 13b may determine the presence or absence of an anomaly by inputting the sound signal into an unsupervised trained machine learning model and comparing an anomaly score output from the machine learning model with the threshold value.

When the moving body 2 is moving at a constant speed, the power determination unit 13c calculates power of the sound signal, which is the cut out sensor signal, and determines the presence or absence of an anomaly based on the power and the threshold value.

The integration unit 15 integrates the sound signals before denoising by the denoising section 135, the sound signals after denoising, and a determination result by the power determination unit 13c or the determination unit 13b as one data group by storing and combining them in their respective predetermined memory areas.

The accumulation unit 16 stores the data group (integration result), which is a result of integration by the integration unit 15, in a storage device so as to accumulate the data group.

The communication unit 14 transmits the integration result stored by the accumulation unit 16 to a remote monitoring apparatus.

The rest of the configuration is the same as that of the second modification of the first embodiment.

Figure 12:
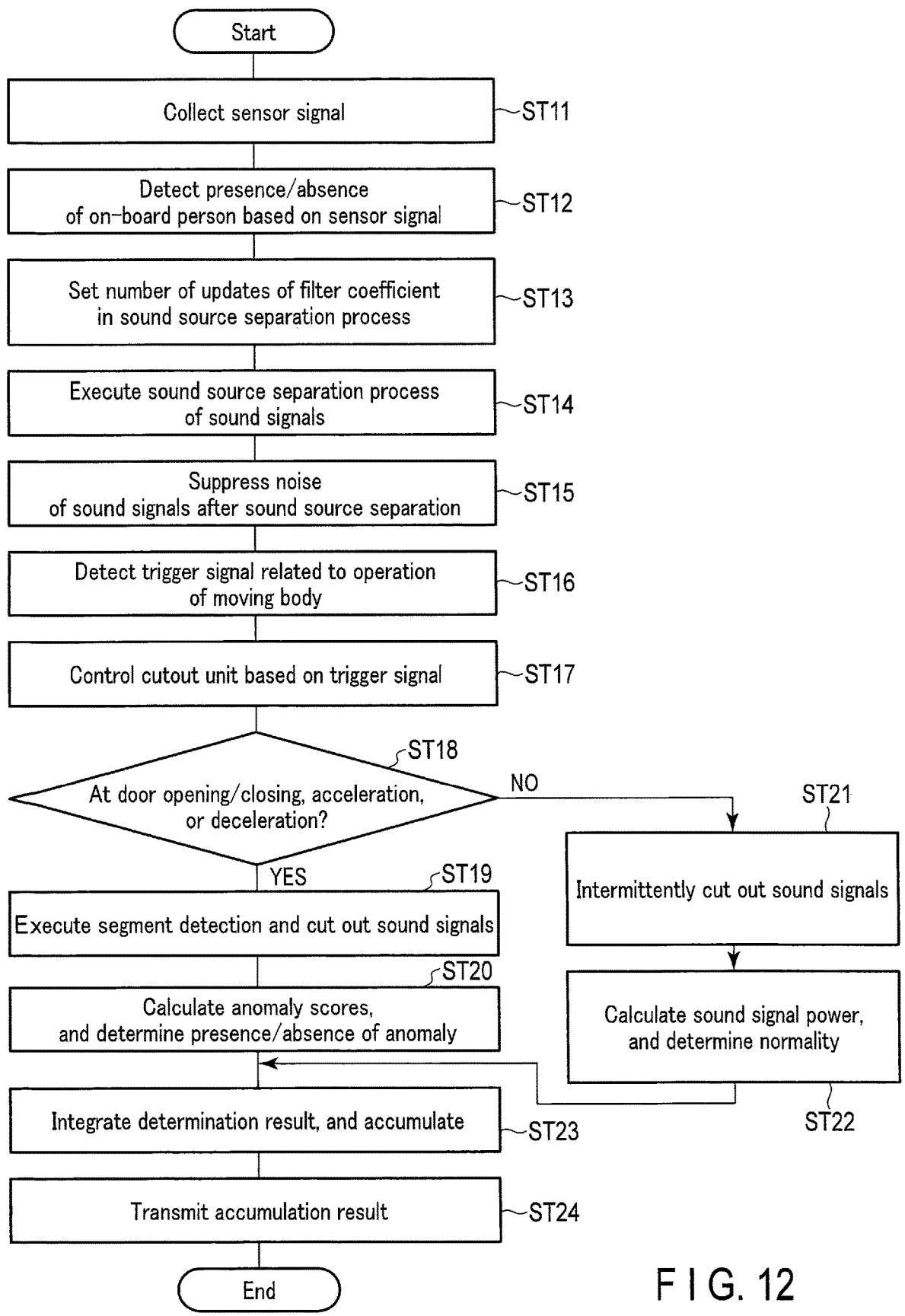
FIG. 12 is a flowchart for describing an example of an operation in the second embodiment

Next, an operation of the second embodiment having the above configuration will be described by using a flowchart in FIG. 12.

First, the collection unit 11 collects a sensor signal (output signal) output from the sensor 1 provided in the moving body 2 (step ST11). The collection unit 11 detects the presence or absence of an on-board person based on the sensor signal (step ST12), and sends a detection result to the update number setting section 132.

After step ST12, the update number setting section 132 sets the number of updates of the filter coefficient of the sound source separation section 133 according to the detection result sent from the on-board person detection section 131 (step ST13). For example, the update number setting section 132 sets the number of updates to the first set value if there is an on-board person, and sets the number of updates to the second set value greater than the first set value if there is no on-board person, depending on the detection result.

After step ST13, the sound source separation section 133 executes a sound source separation process to reduce noise from sound signals output from the plurality of microphones 1a using the filter (step ST14), and outputs those noise-reduced sound signals to the noise suppression section 134. In the sound source separation process, the filter can execute the sound source separation process at a high speed when the number of updates of the coefficient is small, and can execute the sound source separation process with a high degree of accuracy when the number of updates of the coefficient is large.

After step ST14, the noise suppression section 134 suppresses a steady sound (steady noise) such as an air conditioner sound from the sound signals after the sound source separation (step ST15), and sends those suppressed sound signals to the cutout unit 13a1 and the integration unit 15.

On the other hand, the trigger detection unit 12c detects a trigger signal related to door opening/closing, drive propulsion, or drive suppression from the door opening/closing unit 2c, the propulsion unit 2d, or the suppression unit 2e of the moving body 2 (step ST16), and sends a detection result to the cutout condition determination unit 12e.

After step ST16, based on the detection result of the trigger signal, the cutout condition determination unit 12e determines the execution or non-execution of segment detection and an analysis length (time width) as cutout conditions for cutting out the sound signals, and also determines a determination process (power determination/anomaly determination) to be applied to the cut out sound signals. After that, at this time, the cutout condition determination section 12e controls the cutout unit 13a1 by sending the determination result including the execution or non-execution of segment detection, analysis length (fixed length), and determination process to the cutout unit 13a1 (step ST17).

After step ST17, the cutout unit 13a1 determines whether the moving body 2 is at door opening/closing, acceleration, or deceleration according to whether the determination process of the determination result is the anomaly determination (step ST18). If the determination result of step ST18 is positive (ST18: Yes), the moving body 2 is at door opening/closing, acceleration, or deceleration, and proceeds to step ST19. When the determination result of step ST18 is negative (ST18: No), the moving body 2 is running at a constant speed or stopped, and the cutout unit 13a1 proceeds to step ST21.

In step ST19, the cutout unit 13a1 executes segment detection based on the determination result received from the cutout condition determination unit 12e, cuts out the sound signals at the fixed length of the determination result, and sends those cut out sound signals to the determination unit 13b.

After step ST19, the determination unit 13b calculates anomaly scores based on the cut out sound signals, and determines the presence or absence of an anomaly by comparing the anomaly scores with threshold values (step ST20). The determination unit 13b sends a determination result to the integration unit 15.

On the other hand, after step ST18, in step ST21, the cutout unit 13a1 intermittently cuts out the sound signals at the first fixed length based on the determination result received from the cutout condition determination unit 12e, and sends those cut out sound signals to the power determination unit 13c.

After step ST21, the power determination unit 13c calculates power of the cut out sound signals, and determines the presence or absence of an anomaly based on the power and a threshold value (step ST22). The power determination unit 13c also sends a determination result to the integration unit 15.

After step ST20 or ST22, the integration unit 15 integrates the sound signals before denoising received from the plurality of microphones 1a, the sound signals after denoising received from the noise suppression section 134, and the determination result by the power determination unit 13c or the determination unit 13b. After that, the integration unit 15 stores an integration result by means of the accumulation unit 16 (step ST23). The integration unit 15 also activates the communication unit 14.

After step ST23, the communication unit 14 transmits the integration result stored by the accumulation unit 16 to the remote monitoring apparatus (step ST24).

According to the second embodiment as described above, the sensor signals are sound signals. When the moving body 2 is moving at a constant speed, the power determination unit 13c calculates power of the sound signals, which are the cut out sensor signals, and determines the presence or absence of an anomaly based on the power and the threshold value. If the moving body 2 is accelerating or decelerating, the determination unit 13b calculates anomaly scores of the sound signals, which are the cut out sensor signals, and determines the presence or absence of an anomaly based on the anomaly scores and the threshold values. Thereby, in addition to the effects described above, it is possible to reduce the overall processing amount by simplifying the anomaly determination to a simple process that only performs a power determination, especially when the moving body 2 is running at a constant speed.

Third Embodiment

A third embodiment is a specific example of the first and second embodiments and each modification, and is a form in which the above-described condition monitoring apparatuses 10 and 20 are realized by a computer.

Figure 13:
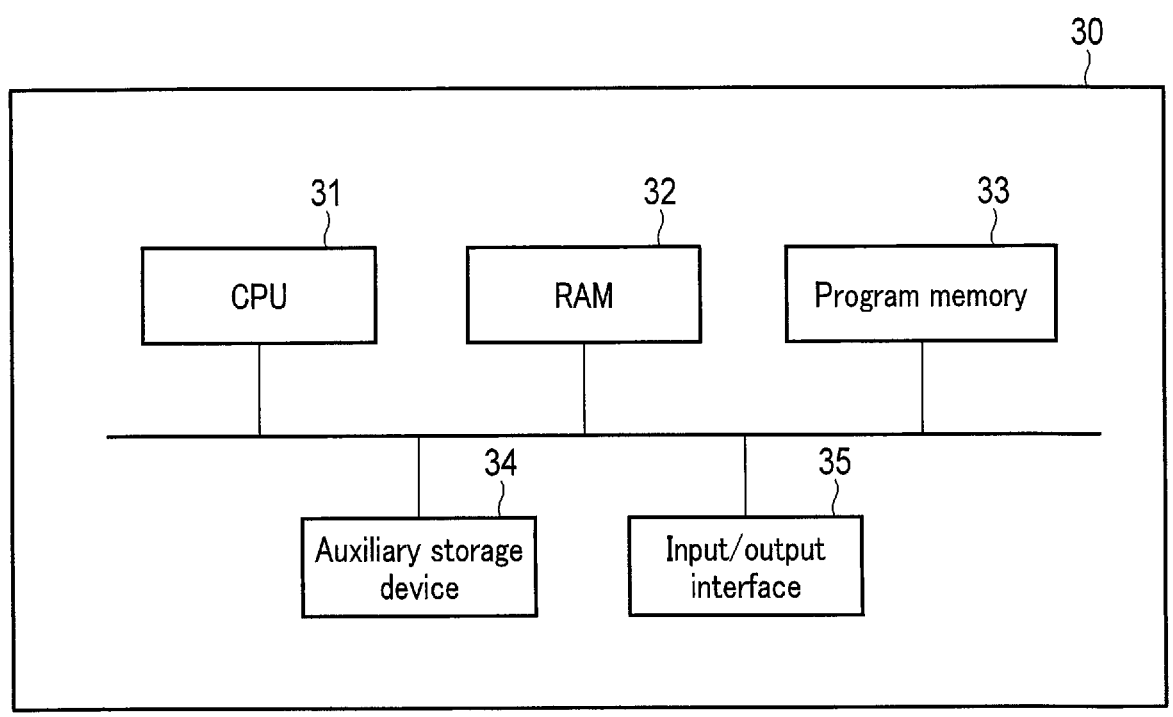
FIG. 13 is a diagram exemplifying a hardware configuration of a condition monitoring apparatus according to a third embodiment.

FIG. 13 is a block diagram exemplifying a hardware configuration of a condition monitoring apparatus according to the third embodiment. This condition monitoring apparatus 30 includes a central processing unit (CPU) 31, a random access memory (RAM) 32, a program memory 33, an auxiliary storage device 34, and an input/output interface 35, as hardware. The CPU 31 communicates with the RAM 32, program memory 33, auxiliary storage device 34, and input/output interface 35 via a bus.

The CPU 31 is an example of a general-purpose processor. The RAM 32 is used by the CPU 31 as a working memory. The RAM 32 includes a volatile memory such as a synchronous dynamic random access memory (SDRAM). The program memory 33 stores a program for realizing each unit corresponding to each embodiment. This program may be a program for causing a computer to realize each function of the above-described condition monitoring apparatuses 10 and 20. Further, as the program memory 33, for example, a part or a combination of a read-only memory (ROM) and the auxiliary storage device 34 may be used. The auxiliary storage device 34 non-temporarily stores data. The auxiliary storage device 34 includes a non-volatile memory such as a hard disc drive (HDD) or solid state drive (SSD).

The input/output interface 35 is an interface that enables connection to another device. The input/output interface 35 is, for example, used for connections with a keyboard, a mouse, and a display.

The program stored in the program memory 33 includes computer-executable instructions. The program (computer-executable instruction), when executed by the CPU 31, which is a processing circuit, causes the CPU 31 to perform predetermined processing. For example, the program, when executed by the CPU 31, causes the CPU 31 to execute a series of processes described with respect to each unit of FIGS. 1, 5, 8, and 10. For example, the computer-executable instruction included in the program, when executed by the CPU 31, causes the CPU 31 to execute a condition monitoring method. The condition monitoring method may include each step corresponding to each function of the condition monitoring apparatuses 10 and 20 described above. The condition monitoring method may also include each step shown in FIGS. 3, 7, 9, and 12, as appropriate.

The program may be provided to the condition monitoring apparatus 30 in a state of being stored in a computer-readable storage medium. In this case, for example, the condition monitoring apparatus 30 further includes a drive (not shown) for reading data from a storage medium, and acquires the program from the storage medium. As the storage medium, for example, a magnetic disk, an optical disk (CD-ROM. CD-R, DVD-ROM, DVD-R, etc.), a magneto-optical disk (MO, etc.), a semiconductor memory, etc. can be used as appropriate. The storage medium may also be referred to as a non-transitory computer readable storage medium. Alternatively, the program may be stored in a server on a communication network so that the condition monitoring apparatus 30 can download the program from the server by means of the input/output interface 35.

Processing circuitry for executing the program is not limited to a general-purpose hardware processor such as the CPU 31, and a dedicated hardware processor such as an application specific integrated circuit (ASIC) may be used. The term "processing circuitry (processing unit)" includes at least one general-purpose hardware processor, at least one dedicated hardware processor, or a combination of at least one general-purpose hardware processor and at least one dedicated hardware processor. In the example shown in FIG. 13, the CPU 31, the RAM 32, and the program memory 33 correspond to the processing circuitry.

Modification of Each Embodiment

In each embodiment and each modification, when the speed of the moving body 2 is constant, the first fixed length is used as a time width for cutting out a sensor signal regardless of whether the moving body 2 is ascending or descending, but the present invention is not limited thereto. That is, a time width for cutting out the sensor signal when the moving body 2 ascends at a constant speed and a time width for cutting out the sensor signal when the moving body 2 descends at a constant speed may be separate fixed lengths. In this case, the sensor signal can be expected to be cut out without excess or deficiency even more.

In each embodiment and each modification, the case in which the speed of the moving body 2 is constant is used, but the present invention is not limited thereto. That is, even when changing portions of acceleration and deceleration are sinusoidal curves, as in an ideal operation of an elevator, and there is no constant speed running of the moving body 2, the above-described effects can be obtained by distinguishing the operation of the moving body 2 into acceleration or deceleration. In this case, using a jerk is preferred from the viewpoint that an operation start timing of acceleration and an operation start timing of deceleration can be easily estimated.

Before describing the embodiments, the elevator, automobile, train, escalator, and mechanical parking lot were mentioned as examples of the moving body 2, which will be described in a supplementary manner. When the moving body 2 is an elevator, automobile, train, escalator, or mechanical parking lot, the following are applicable as the propulsion unit 2d, the suppression unit 2e, a disturbance to be separated by the sound source separation section 133, and a disturbance suppressed by the noise suppression section 134.

If the moving body 2 is an elevator, the propulsion unit 2d is an accelerator function such as a prime mover (motor) or a hoist, and the suppression unit 2e is a brake function such as an electromagnetic brake or a weight. The disturbance separated by the sound source separation section 133 is a human voice in the car, and the disturbance suppressed by the noise suppression section 134 is an air conditioner sound and ambient noise in the car.

If the moving body 2 is an automobile, the propulsion unit 2d is an engine or transmission, and the suppression unit 2e is a brake. The disturbance separated by the sound source separation section 133 is road noise, wind noise, and a human voice in the cabin, and the disturbance suppressed by the noise suppression section 134 is ambient noise.

If the moving body 2 is a train, the propulsion unit 2d is a motor, and the suppression unit 2e is a brake on the vehicle side or on the track side. The disturbance separated by the sound source separation section 133 is running noise and wind noise, and the disturbance suppressed by the noise suppression section 134 is ambient noise.

If the moving body 2 is an escalator, the propulsion unit 2d is a hoist (constant speed), and the suppression unit 2e is a brake. The disturbance separated by the sound source separation section 133 is a human voice, and the disturbance suppressed by the noise suppression section 134 is ambient noise. The escalator is not limited to one in a constant operation, but may be one irregularly operated with an automatic actuator that uses a motion sensor. In the latter case, the automatic actuator of the escalator also functions as the on-board person detection section 131.

If the moving body 2 is a mechanical parking lot, the propulsion unit 2d is a hoist (constant speed), and the suppression unit 2e is a weight. The disturbance separated by the sound source separation section 133 is a human voice, and the disturbance suppressed by the noise suppression section 134 is ambient noise. The mechanical parking lot is a multistage elevating type and may be referred to as a mechanical multilevel parking lot.

Therefore, when the condition monitoring apparatuses 10, 20, and 30 according to each embodiment and each modification are implemented in an elevator, automobile, train, escalator, or mechanical parking lot, it is possible to collect the trigger signals and sensor signals related to the propulsion unit 2*d* and the suppression unit 2*e* described above. The disturbances described above can be separated or suppressed by the sound source separation section 133 and the noise suppression section 134. As such, the condition monitoring apparatuses 10, 20, and 30 according to each embodiment and each modification are applicable to any moving body 2 such as an elevator, an automobile, a train, an escalator, and a mechanical parking lot.

The condition monitoring apparatuses 10, 20, and 30 according to each embodiment and each modification are not limited to the moving body 2 exemplified above, but can be implemented, as appropriate, in any devices that carry people by mechanical drive, such as a ship, a cable car, and a roller coaster, for example. Alternatively, the condition monitoring apparatuses 10, 20, and 30 can be implemented, as appropriate, in mechanical devices that do not carry people, such as an unmanned mechanical parking lot, an industrial robot, a belt conveyor, and an autonomous robot.

Each embodiment and each modification may also be expressed as a mechanical device or moving body 2, equipped with the condition monitoring apparatuses 10, 20, and 30. Similarly, each embodiment and each modification may be expressed as a moving method or program that includes each step of the condition monitoring method described above.

According to at least one of the embodiments described above, the accuracy of anomaly detection can be maintained while reducing the processing amount of the sensor signals. This is also true for at least one of the modifications described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A condition monitoring apparatus comprising:
   processing circuitry configured to:
   collect a sensor signal output from a microphone sensor that monitors a condition of a mechanical device that is at least partially mobile, the mechanical device including a motor, a door controller, and a brake;
   detect a trigger signal from the motor, the door controller, or the brake,
   based on the detected trigger signal, determine conditions to cut out the sensor signal output from the microphone sensor,
   based on the determined conditions, cut out the sensor signal output from the microphone sensor in a first time width without performing segment detection, in response to the mechanical device moving at a constant speed,
   based on the determined conditions, cut out the sensor signal output from the microphone sensor in a second time width by performing segment detection, in response to the mechanical device accelerating or decelerating, and
   diagnose a presence or absence of an anomaly in the mechanical device, which includes the motor, the door controller, and the brake, based on the cut out sensor signal output from the microphone sensor.

2. The condition monitoring apparatus according to claim 1, wherein
   the mechanical device includes a door that is openable and closable via the door controller, and
   the processing circuitry is configured to, when the mechanical device stops to start an opening or closing operation of the door, cut out the sensor signal in a third time width from a point in time of the start.

3. The condition monitoring apparatus according to claim 2, wherein the processing circuitry is further configured to detect a trigger signal to start the opening or closing operation, and control cutting out the sensor signal based on a result of the detection.

4. The condition monitoring apparatus according to claim 1, wherein the processing circuitry is further configured to determine, based on a trigger signal to promote or suppress driving of the mechanical device, that a speed of the mechanical device is in a constant speed condition, an acceleration condition, or a deceleration condition, and control cutting out the sensor signal based on a result of the determination.

5. The condition monitoring apparatus according to claim 1, wherein
   the sensor signal is a sound signal, and
   the processing circuitry includes a filter that reduces noise from the sound signal, which is the cut out sensor signal, and is further configured to:
   use the sound signal from which the noise is reduced for the diagnosis; and
   set a number of updates of a coefficient of the filter according to a presence or absence of an on-board person in the mechanical device.

6. The condition monitoring apparatus according to claim 5, wherein the processing circuitry is configured to set the number of updates to a first set value when there is the on-board person, and set the number of updates to a second set value greater than the first set value when there is no on-board person.

7. The condition monitoring apparatus according to claim 5, wherein the processing circuitry is further configured to detect the presence or absence of an on-board person based on the sound signal, and use a result of the detection for the setting.

8. The condition monitoring apparatus according to claim 5, wherein the processing circuitry is further configured to detect the presence or absence of an on-board person based on an output signal output from a motion sensor, a weight sensor, or an image sensor provided in the mechanical device, and use a result of the detection for the setting.

9. The condition monitoring apparatus according to claim 1, wherein the processing circuitry is configured to calculate an anomaly score based on the cut out sensor signal, and diagnose that there is the anomaly when the anomaly score is greater than a threshold value.

10. The condition monitoring apparatus according to claim 9, wherein the processing circuitry is configured to diagnose the presence or absence of an anomaly by inputting the cut out sensor signal into an unsupervised trained machine learning model and comparing the anomaly score output from the machine learning model and the threshold value.

11. The condition monitoring apparatus according to claim 10, wherein the trained machine learning model is a neural network that has been trained in advance by unsupervised learning.

12. The condition monitoring apparatus according to claim 11, wherein the neural network is an autoencoder, a convolutional autoencoder, or a variational autoencoder.

13. The condition monitoring apparatus according to claim 1, wherein
the sensor signal is a sound signal, and
the processing circuitry is configured to:
calculate a power of the sound signal, which is the cut out sensor signal, when the mechanical device moves at a constant speed, and diagnose the presence or absence of an anomaly based on the power and a threshold value; and
calculate an anomaly score of the sound signal, which is the cut out sensor signal, when the mechanical device accelerates or decelerates, and diagnose the presence or absence of an anomaly based on the anomaly score and a threshold value.

14. The condition monitoring apparatus according to claim 1, wherein the first time width is longer than the second time width.

15. The condition monitoring apparatus according to claim 1, wherein the processing circuitry is configured to determine the conditions to cut out the sensor signal based on the detected trigger signal and one of an overlap ratio and a shift amount, the overlap ratio being a ratio of a portion of the first time width that overlaps with the second time width to the first time width, the shift amount being a time difference between a starting point of the first time width and a starting point of the second time width.

16. The condition monitoring apparatus according to claim 1, wherein, in response to the mechanical device moving at a constant speed, the processing circuitry is configured to cut out the sensor signal in the first time width at a constant time interval, the sensor signal representing a steady sound.

17. The condition monitoring apparatus according to claim 1, wherein, in response to the mechanical device accelerating or decelerating, the processing circuitry is configured to cut out the sensor signal without excess or deficiency using a change in sign of acceleration of the mechanical device, a trigger signal from the motor or the brake linked to an operation start of the mechanical device, or a segment detection process by cross-correlation matching using a template signal, the sensor signal representing an unsteady sound.

18. A condition monitoring method comprising:
collecting a sensor signal output from a microphone sensor that monitors a condition of a mechanical device that is at least partially mobile, the mechanical device including a motor, a door controller, and a brake;
detecting a trigger signal from the motor, the door controller, or the brake;
based on the detected trigger signal, determining conditions to cut out the sensor signal output from the microphone sensor;
based on the determined conditions, cutting out the sensor signal output from the microphone sensor in a first time width without performing segment detection, in response to the mechanical device moving at a constant speed;
based on the determined conditions, cutting out the sensor signal output from the microphone sensor in a second time width by performing segment detection, in response to the mechanical device accelerating or decelerating; and
diagnosing a presence or absence of an anomaly in the mechanical device, which includes the motor, the door controller, and the brake, based on the cut out sensor signal output from the microphone sensor.

19. A non-transitory computer readable storage medium including computer executable instructions, wherein the instructions, when executed by a processor, cause the processor to perform a method comprising:
collecting a sensor signal output from a microphone sensor that monitors a condition of a mechanical device that is at least partially mobile, the mechanical device including a motor, a door controller, and a brake;
detecting a trigger signal from the motor, the door controller, or the brake;
based on the detected trigger signal, determining conditions to cut out the sensor signal output from the microphone sensor;
based on the determined conditions, cutting out the sensor signal output from the microphone sensor in a first time width without performing segment detection, in response to the mechanical device moving at a constant speed;
based on the determined conditions, cutting out the sensor signal output from the microphone sensor in a second time width by performing segment detection, in response to the mechanical device accelerating or decelerating; and
diagnosing a presence or absence of an anomaly in the mechanical device, which includes the motor, the door controller, and the brake, based on the cut out sensor signal output from the microphone sensor.

* * * * *